(12) United States Patent
Takeda et al.

(10) Patent No.: US 12,503,110 B2
(45) Date of Patent: Dec. 23, 2025

(54) UNMANNED VEHICLE MANAGEMENT METHOD AND SYSTEM FOR DETERMINING INTER-VEHICLE DISTANCE BETWEEN SPRINKLING VEHICLE AND UNMANNED VEHICLE

(71) Applicant: Komatsu Ltd., Tokyo (JP)

(72) Inventors: Kazuma Takeda, Tokyo (JP); Takashi Hiranaka, Tokyo (JP); Kenta Osagawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 223 days.

(21) Appl. No.: 18/273,578

(22) PCT Filed: Jan. 5, 2022

(86) PCT No.: PCT/JP2022/000115
§ 371 (c)(1),
(2) Date: Jul. 21, 2023

(87) PCT Pub. No.: WO2022/176414
PCT Pub. Date: Aug. 25, 2022

(65) Prior Publication Data
US 2024/0075928 A1 Mar. 7, 2024

(30) Foreign Application Priority Data
Feb. 17, 2021 (JP) ................ 2021-023449

(51) Int. Cl.
B60W 30/16 (2020.01)
B60W 10/18 (2012.01)
(Continued)

(52) U.S. Cl.
CPC ............ *B60W 30/16* (2013.01); *B60W 10/18* (2013.01); *B60W 60/001* (2020.02); *E01H 3/02* (2013.01);
(Continued)

(58) Field of Classification Search
CPC .... B60W 30/16; B60W 30/165; B60W 10/18; B60W 60/001; B60W 2300/125;
(Continued)

(56) References Cited

U.S. PATENT DOCUMENTS 6,246,932 B1 * 6/2001 Kageyama ........... G05D 1/0297
701/50
10,095,241 B2 * 10/2018 Nakagawa ........... G05D 1/0293
(Continued)

FOREIGN PATENT DOCUMENTS

DE 102019202773 A1 * 9/2020
JP H11-326519 A 11/1999
(Continued)

OTHER PUBLICATIONS

Notice of Acceptance dated Dec. 4, 2024, issued in the corresponding AU patent application No. 2022221753.

Primary Examiner — Andrew R Dyer
(74) Attorney, Agent, or Firm — Troutman Pepper Locke LLP

(57) ABSTRACT

An unmanned vehicle management system includes: an inter-vehicle distance determination unit that determines an inter-vehicle distance between a sprinkling vehicle and an unmanned vehicle traveling behind the sprinkling vehicle in a same direction as that of the sprinkling vehicle based on a sprinkling state from a sprinkling spray provided in the sprinkling vehicle traveling in a work site; and an output unit that outputs, to the unmanned vehicle, inter-vehicle distance data indicating the inter-vehicle distance determined by the inter-vehicle distance determination unit.

17 Claims, 13 Drawing Sheets

(51) Int. Cl.
*B60W 60/00* (2020.01)
*E01H 3/02* (2006.01)

(52) U.S. Cl.
CPC ... *B60W 2300/125* (2013.01); *B60W 2520/06* (2013.01); *B60W 2554/802* (2020.02)

(58) Field of Classification Search
CPC ........ B60W 2520/06; B60W 2554/802; E01H 3/02; B60Y 2200/22
USPC .......................................................... 701/96
See application file for complete search history.

(56) References Cited

U.S. PATENT DOCUMENTS

| | | | |
|---|---|---|---|
| 11,235,890 B1 * | 2/2022 | Dahlstrom | B05B 13/005 |
| 2013/0299601 A1 * | 11/2013 | Ballu | B05B 13/005 239/722 |
| 2014/0358382 A1 | 12/2014 | Kou et al. | |
| 2018/0201260 A1 * | 7/2018 | Ichikawa | G01S 17/58 |
| 2018/0354624 A1 * | 12/2018 | Liu | A01C 23/047 |
| 2019/0161090 A1 * | 5/2019 | Miura | B60W 30/16 |
| 2020/0150669 A1 * | 5/2020 | Lacaze | G05D 1/646 |
| 2021/0000006 A1 * | 1/2021 | Ellaboudy | G05D 1/243 |
| 2021/0046499 A1 * | 2/2021 | Vance | E01H 3/02 |
| 2021/0094688 A1 | 4/2021 | Sorek et al. | |
| 2022/0308589 A1 | 9/2022 | Ishii et al. | |

FOREIGN PATENT DOCUMENTS

| | | |
|---|---|---|
| JP | 2013-516557 A | 5/2013 |
| JP | 2013-196051 A | 9/2013 |
| JP | 2015-075826 A | 4/2015 |
| JP | 2016-035707 A | 3/2016 |
| JP | 2016-153987 A | 8/2016 |
| SE | 1950565 A1 | 2/2020 |
| WO | 2011/090521 A2 | 7/2011 |
| WO | 2019180716 A1 | 9/2019 |
| WO | 2020226168 A1 | 11/2020 |

* cited by examiner

UNMANNED VEHICLE MANAGEMENT METHOD AND SYSTEM FOR DETERMINING INTER-VEHICLE DISTANCE BETWEEN SPRINKLING VEHICLE AND UNMANNED VEHICLE

FIELD

The present disclosure relates to an unmanned vehicle management system and an unmanned vehicle management method.

BACKGROUND

In order to suppress diffusion of dust or sand at a work site, there is a case where sprinkling is performed by a sprinkling vehicle. Patent Literature 1 discloses a movable fluid transporter that transports a fluid to a site.

CITATION LIST

Patent Literature

Patent Literature 1: JP 2013-516557 A

SUMMARY

Technical Problem

In a wide-area work site such as a mine, unmanned vehicles operate. In a case where an unmanned vehicle following a sprinkling vehicle during sprinkling approaches too close, there is a possibility that traveling of the unmanned vehicle is hindered.

An object of the present disclosure is to enable an unmanned vehicle to smoothly travel at a work site.

Solution to Problem

According to an aspect of the present invention, an unmanned vehicle management system comprises: an inter-vehicle distance determination unit that determines an inter-vehicle distance between a sprinkling vehicle and an unmanned vehicle traveling behind the sprinkling vehicle in a same direction as that of the sprinkling vehicle based on a sprinkling state from a sprinkling spray provided in the sprinkling vehicle traveling in a work site; and an output unit that outputs, to the unmanned vehicle, inter-vehicle distance data indicating the inter-vehicle distance determined by the inter-vehicle distance determination unit.

Advantageous Effects of Invention

According to the present disclosure, the unmanned vehicle can smoothly travel in the work site.

DESCRIPTION OF EMBODIMENTS

Hereinafter, embodiments according to the present disclosure will be described with reference to the drawings, but the present disclosure is not limited to the embodiments. The components of the embodiments described below can be appropriately combined. In addition, some components may not be used.

[Overview of Management System]

Figure 1:
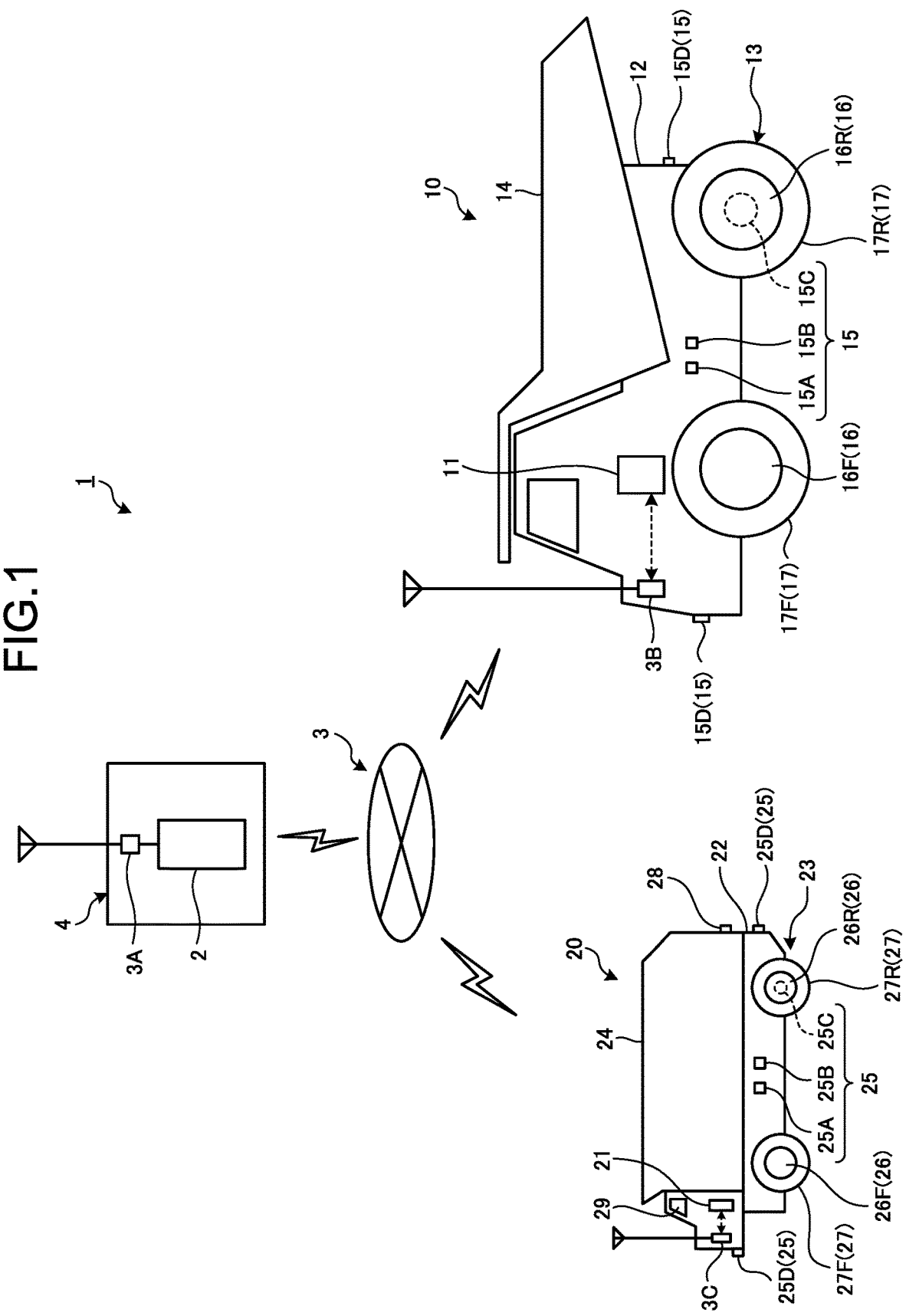
FIG. 1 is a schematic diagram illustrating a management system of a work site according to an embodiment.

FIG. 1 is a schematic diagram illustrating an unmanned vehicle management system 1 according to an embodiment. The management system 1 manages an unmanned vehicle operating at a work site. The unmanned vehicle refers to a work vehicle that operates in an unmanned manner without depending on a driving operation by a driver. In the embodiment, the unmanned vehicle operating at the work site includes a first unmanned vehicle 10 and a second unmanned vehicle 20.

In the embodiment, the first unmanned vehicle 10 is an unmanned haul vehicle. The second unmanned vehicle 20 is an unmanned sprinkling vehicle. In the following description, the first unmanned vehicle 10 is appropriately referred to as an unmanned haul vehicle 10, and the second unmanned vehicle 20 is appropriately referred to as an unmanned sprinkling vehicle 20.

The unmanned haul vehicle 10 travels in an unmanned manner at a work site to transport a load. An unmanned dump truck is exemplified as the unmanned haul vehicle 10. An excavated object excavated at a work site is exemplified as a load to be transported to the unmanned haul vehicle 10.

The unmanned sprinkling vehicle 20 travels in the work site in an unmanned manner and sprinkles water. An unmanned sprinkling truck is exemplified as the unmanned sprinkling vehicle 20. The unmanned sprinkling vehicle 20 sprinkles water to suppress diffusion of dust or sand at the work site.

The management system 1 includes a management device 2 and a communication system 3. The management device 2 is installed in a control facility 4 of the work site. Administrators are present in the control facility 4.

The unmanned haul vehicle 10 includes a control device 11. The unmanned sprinkling vehicle 20 includes a control device 21. The management device 2, the control device 11, and the control device 21 wirelessly communicate with each other via the communication system 3. A wireless communication device 3A is connected to the management device 2. A wireless communication device 3B is connected to the control device 11. A wireless communication device 3C is connected to the control device 21. The communication system 3 includes the wireless communication device 3A, the wireless communication device 3B, and the wireless communication device 3C.

[Unmanned Haul Vehicle]

Figure 2:
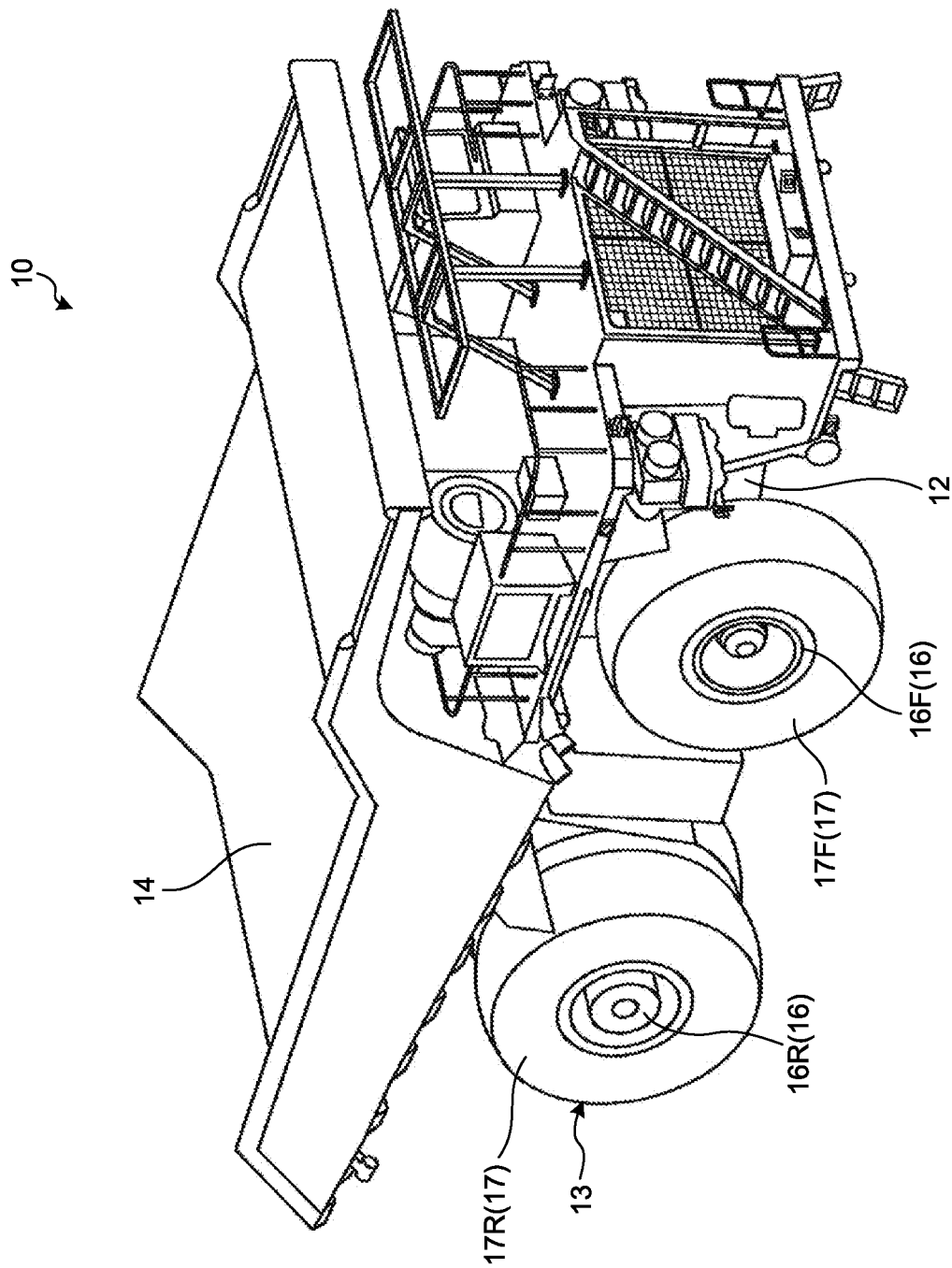
FIG. 2 is a perspective view illustrating an unmanned haul vehicle according to the embodiment.

FIG. 2 is a perspective view illustrating the unmanned haul vehicle 10 according to the embodiment. As illustrated in FIGS. 1 and 2, the unmanned haul vehicle 10 includes the wireless communication device 3B, the control device 11, a vehicle body 12, a traveling device 13, a dump body 14, and a sensor system 15.

The vehicle body 12 includes a vehicle body frame. The vehicle body 12 is supported by the traveling device 13. The vehicle body 12 supports the dump body 14.

The traveling device 13 generates a driving force for causing the unmanned haul vehicle 10 to travel. The traveling device 13 generates a braking force for decelerating or stopping the unmanned haul vehicle 10. The traveling device 13 generates a steering force for turning the unmanned haul vehicle 10. The traveling device 13 moves the unmanned haul vehicle 10 forward or backward. The traveling device 13 includes wheels 16. Tires 17 are mounted on the wheels 16. The wheels 16 include front wheels 16F and rear wheels 16R. The tires 17 include front tires 17F mounted on the front wheels 16F and rear tires 17R mounted on the rear wheels 16R. When the wheels 16 rotate in a state where the tires 17 are in contact with the road surface of the work site, the unmanned haul vehicle 10 travels through the work site.

The dump body 14 is a member on which a load is loaded. At least a part of the dump body 14 is disposed above the vehicle body 12.

The sensor system 15 includes a position sensor 15A, an azimuth sensor 15B, a speed sensor 15C, and an obstacle sensor 15D. The position sensor 15A detects the position of the unmanned haul vehicle 10. The position of the unmanned haul vehicle 10 is detected using a global navigation satellite system (GNSS). The position sensor 15A includes a GNSS receiver and detects the position of the unmanned haul vehicle 10 in the global coordinate system. The azimuth sensor 15B detects the azimuth of the unmanned haul vehicle 10. A gyro sensor is exemplified as the azimuth sensor 15B. The speed sensor 15C detects a traveling speed of the unmanned haul vehicle 10. As the speed sensor 15C, a pulse sensor that detects the rotation of the wheel 16 is exemplified. The obstacle sensor 15D detects an obstacle around the unmanned haul vehicle 10. The obstacle sensor 15D detects an obstacle in a non-contact manner. Examples of the obstacle sensor 15D include a laser sensor (light detection and ranging (LIDAR)) and a radar sensor (radio detection and ranging (RADAR)).

[Unmanned Sprinkling Vehicle]

Figure 3:
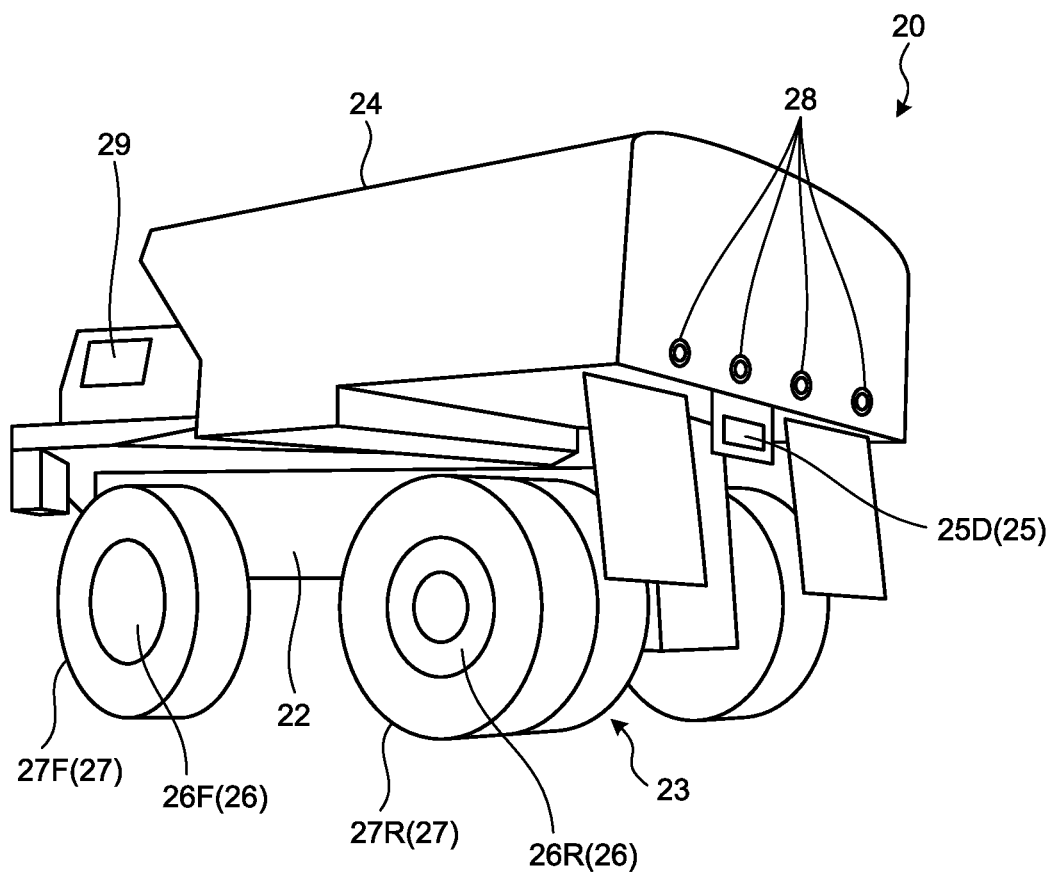
FIG. 3 is a perspective view illustrating an unmanned sprinkling vehicle according to the embodiment.

FIG. 3 is a perspective view illustrating the unmanned sprinkling vehicle 20 according to the embodiment. As illustrated in FIGS. 1 and 3, the unmanned sprinkling vehicle 20 includes the wireless communication device 3C, the control device 21, a vehicle body 22, a traveling device 23, a tank 24, a sensor system 25, and a sprinkling spray 28.

The vehicle body 22 includes a vehicle body frame. The vehicle body 22 is supported by the traveling device 23. The vehicle body 22 supports the tank 24.

In the embodiment, a cab 29 is provided in the vehicle body 22. The cab 29 is provided at a front portion of the vehicle body 22. The driver can board the cab 29 and perform a driving operation of the unmanned sprinkling vehicle 20. For example, in a case of performing maintenance or inspection of the unmanned sprinkling vehicle 20, the driver performs a driving operation of the unmanned sprinkling vehicle 20. In the embodiment, the unmanned sprinkling vehicle 20 operates in an unmanned manner at least when sprinkling water at the work site. Note that the cab 29 may not be provided in the unmanned sprinkling vehicle 20.

The traveling device 23 generates a driving force for traveling the unmanned sprinkling vehicle 20. The traveling device 23 generates a braking force for decelerating or stopping the unmanned sprinkling vehicle 20. The traveling device 23 generates a steering force for turning the unmanned sprinkling vehicle 20. The traveling device 23 moves the unmanned sprinkling vehicle 20 forward or backward. The traveling device 23 includes wheels 26. Tires 27 are mounted on the wheels 26. The wheels 26 include front wheels 26F and rear wheels 26R. The front wheels 26F are steering wheels, and the rear wheels 26R are driving wheels. Both the front wheels 26F and the rear wheels 26R may be steering wheels. Both the front wheels 26F and the rear wheels 26R may be driving wheels. The front wheels 26F may be driving wheels, and the rear wheels 26R may be steering wheels. The tires 27 include front tires 27F mounted on the front wheels 26F and rear tires 27R mounted on the rear wheels 26R. When the wheels 26 rotate in a state where the tires 27 are in contact with the road surface of the work site, the unmanned sprinkling vehicle 20 travels through the work site.

The tank 24 is a member that stores water for sprinkling. At least a part of the tank 24 is disposed above the vehicle body 22.

The sensor system 25 includes a position sensor 25A, an azimuth sensor 25B, a speed sensor 25C, and an obstacle sensor 25D. The position sensor 25A detects the position of the unmanned sprinkling vehicle 20. The position of the unmanned sprinkling vehicle 20 is detected using a global navigation satellite system (GNSS). The position sensor 25A includes a GNSS receiver and detects the position of the unmanned sprinkling vehicle 20 in the global coordinate system. The azimuth sensor 25B detects the azimuth of the unmanned sprinkling vehicle 20. A gyro sensor is exemplified as the azimuth sensor 25B. The speed sensor 25C detects a traveling speed of the unmanned sprinkling vehicle 20. As the speed sensor 25C, a pulse sensor that detects the rotation of the wheel 26 is exemplified. The obstacle sensor 25D detects an obstacle around the unmanned sprinkling vehicle 20. The obstacle sensor 25D detects an obstacle in a non-contact manner. Examples of the obstacle sensor 25D include a laser sensor (light detection and ranging (LIDAR)) and a radar sensor (radio detection and ranging (RADAR)).

The sprinkling spray 28 sprays water in the tank 24. The sprinkling spray 28 is disposed at the rear portion of the unmanned sprinkling vehicle 20. In the embodiment, the sprinkling spray 28 is disposed at the rear portion of the tank 24. The sprinkling spray 28 sprinkles water behind the unmanned sprinkling vehicle 20. In the embodiment, a plurality of sprinkling sprays 28 is provided. The plurality of sprinkling sprays 28 is arranged at intervals in the vehicle width direction of the unmanned sprinkling vehicle 20 at the rear portion of the tank 24. The vehicle width direction refers to a direction parallel to the rotation axis of the wheels 26 when the unmanned sprinkling vehicle 20 is in a straight traveling state.

[Work Site]

Figure 4:
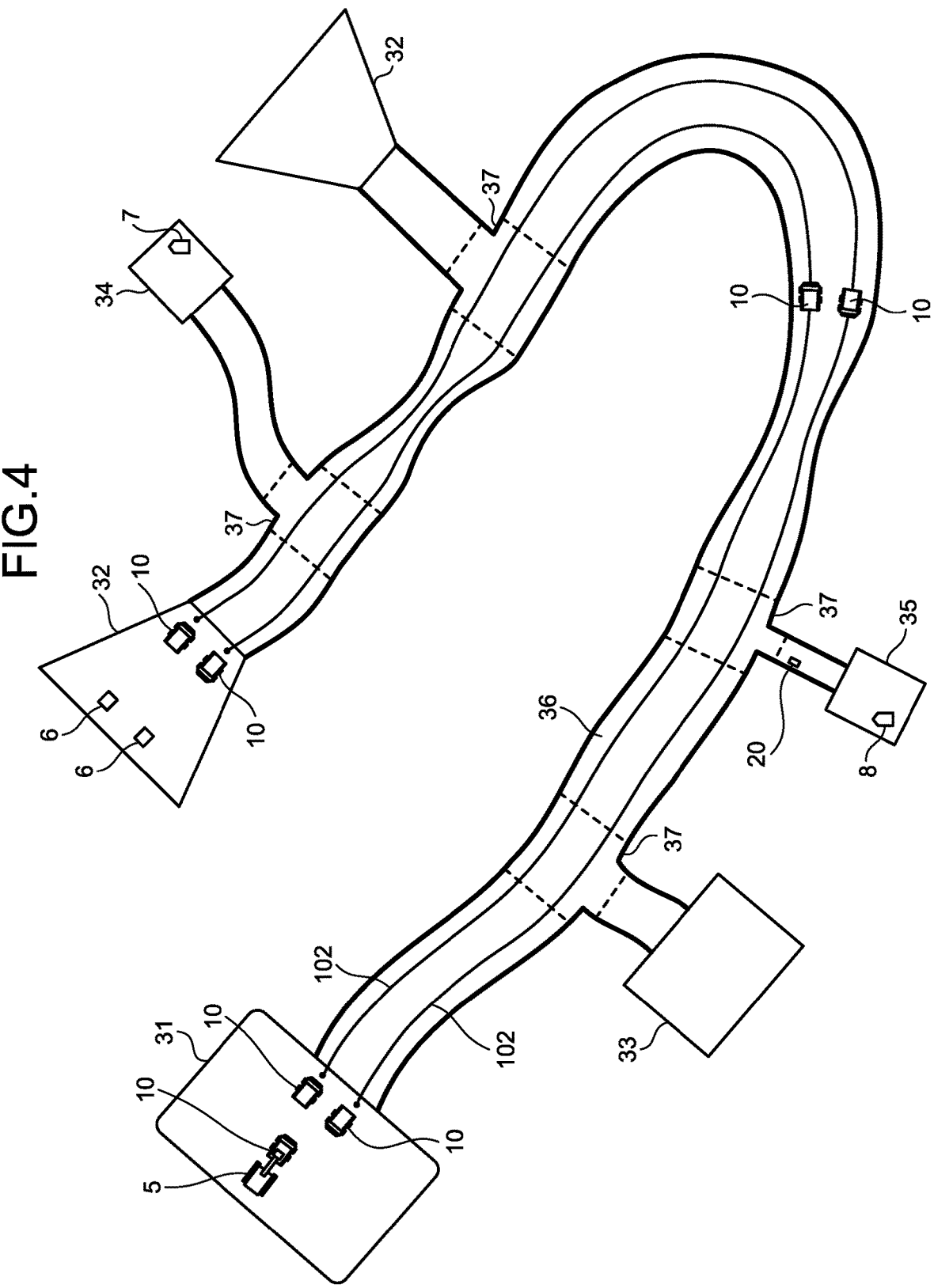
FIG. 4 is a schematic diagram illustrating a work site according to the embodiment.

FIG. 4 is a schematic diagram illustrating a work site according to the embodiment. Examples of the work site include a mine or a quarry. The mine refers to a place or business site where minerals are mined. The quarry refers to a place or business site where stones are mined. At the work site, each of the unmanned haul vehicle 10 and the unmanned sprinkling vehicle 20 operates.

In the embodiment, the work site is a mine. Examples of the mine include a metal mine for mining metal, a non-metal mine for mining limestone, and a coal mine for mining coal.

At the work site, a loading area 31, a discharging area 32, a parking area 33, a fuel filling area 34, a water supply area 35, a travel path 36, and an intersection 37 are provided.

The loading area 31 is an area in which a loading operation of loading a load on the unmanned haul vehicle 10 is performed. In the loading area 31, a loader 5 operates. As the loader 5, an excavator is exemplified.

The discharging area 32 refers to an area where discharging work for discharging a load from the unmanned haul vehicle 10 is performed. A crusher 6 is provided in the discharging area 32.

The parking area 33 is an area where at least one of the unmanned haul vehicle 10 and the unmanned sprinkling vehicle 20 is parked.

The fuel filling area 34 is an area where at least one of the unmanned haul vehicle 10 and the unmanned sprinkling vehicle 20 is supplied with fuel. An oil feeder 7 that supplies fuel is provided in the fuel filling area 34.

The water supply area 35 is an area where the unmanned sprinkling vehicle 20 is supplied with water. In the water supply area 35, water for sprinkling is supplied to the tank 24. The water supply area 35 is provided with a water supplier 8 that supplies water to the tank 24.

The travel path 36 refers to an area where an unmanned vehicle travels toward at least one of the loading area 31, the discharging area 32, the parking area 33, the fuel filling area 34, and the water supply area 35. The travel path 36 is provided so as to connect at least the loading area 31 and the discharging area 32. In the embodiment, the travel path 36 is connected to each of the loading area 31, the discharging area 32, the parking area 33, the fuel filling area 34, and the water supply area 35.

The intersection 37 refers to an area where a plurality of travel paths 36 intersects or an area where one travel path 36 branches into a plurality of travel paths 36.

[Management System]

Figure 5:
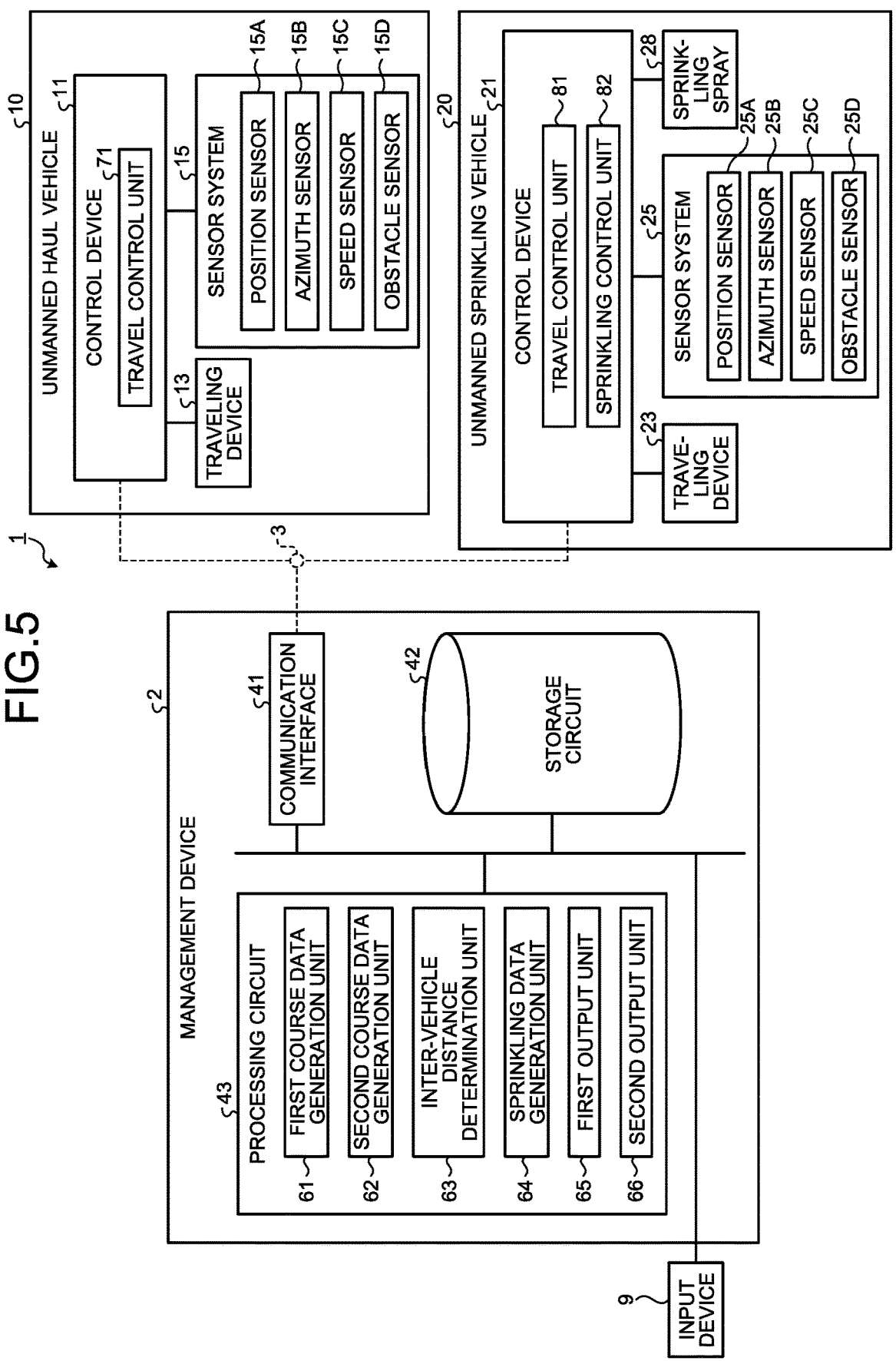
FIG. 5 is a functional block diagram illustrating a management system of a work site according to the embodiment.

FIG. 5 is a functional block diagram illustrating the management system 1 of the work site according to the embodiment. The management system 1 includes the management device 2, the communication system 3, the control device 11, and the control device 21.

The management device 2 includes a computer system. The management device 2 is connected to an input device 9. The management device 2 includes a communication interface 41, a storage circuit 42, and a processing circuit 43.

The input device 9 is connected to the processing circuit 43. The input device 9 is operated by an administrator of the control facility 4. The input device 9 generates input data on the basis of an operation of the administrator. The input data generated by the input device 9 is input to the processing circuit 43. Examples of the input device 9 include a touch panel, a computer keyboard, a mouse, and an operation button. Note that the input device 9 may be a non-contact type input device including an optical sensor, or may be a voice input device.

The communication interface 41 is connected to the processing circuit 43. The communication interface 41 controls communication between the management device 2 and at least one of the control device 11 and the control device 21. The communication interface 41 communicates with at least one of the control device 11 and the control device 21 via the communication system 3.

The storage circuit 42 is connected to the processing circuit 43. The storage circuit 42 stores data. As the storage circuit 42, a nonvolatile memory or a volatile memory is exemplified. Examples of the nonvolatile memory include a read only memory (ROM) and a storage. Examples of the storage include a hard disk drive (HDD) and a solid state drive (SSD). As the volatile memory, a random access memory (RAM) is exemplified.

The processing circuit 43 performs arithmetic processing and control command output processing. A processor is exemplified as the processing circuit 43. Examples of the processor include a central processing unit (CPU) and a micro processing unit (MPU). A computer program is stored in the storage circuit 42. The processing circuit 43 exerts a predetermined function by acquiring and executing a computer program from the storage circuit 42.

The processing circuit 43 includes a first course data generation unit 61, a second course data generation unit 62, an inter-vehicle distance determination unit 63, a sprinkling data generation unit 64, a first output unit 65, and a second output unit 66.

The first course data generation unit 61 generates first course data indicating a traveling condition of the unmanned haul vehicle 10 set at the work site. The first course data generation unit 61 may generate the first course data on the basis of the input data from the input device 9.

The second course data generation unit 62 generates second course data indicating a traveling condition of the unmanned sprinkling vehicle 20 set at the work site. The second course data generation unit 62 may generate the second course data on the basis of the input data from the input device 9.

Figure 6:
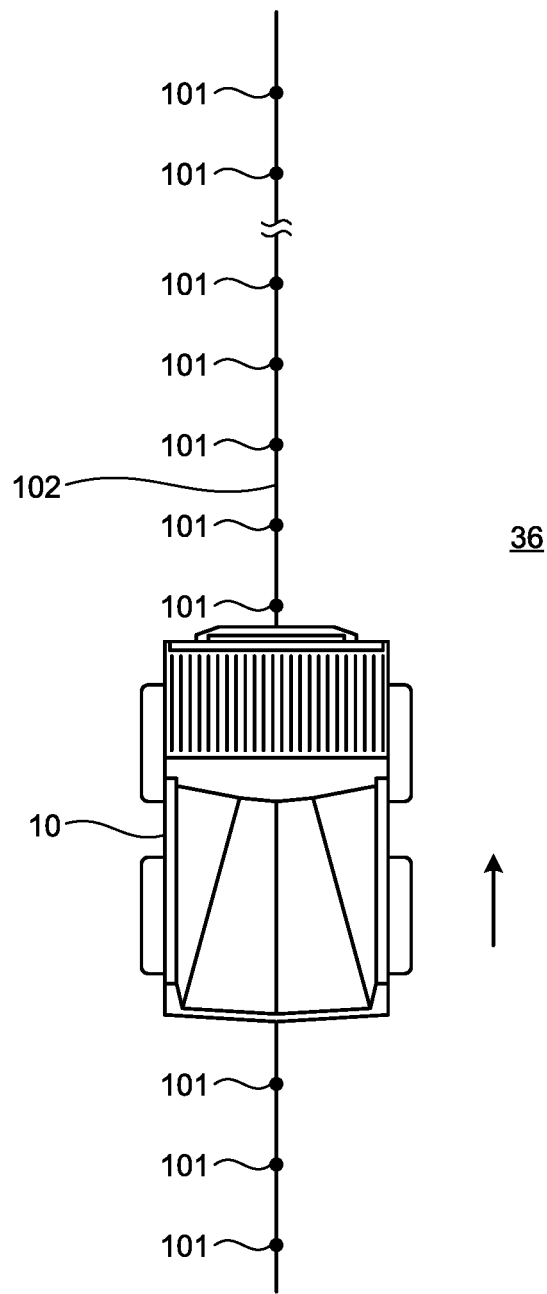
FIG. 6 is a diagram for explaining first course data of the unmanned haul vehicle according to the embodiment.

FIG. 6 is a diagram for explaining first course data of the unmanned haul vehicle 10 according to the embodiment. The first course data defines a traveling condition of the unmanned haul vehicle 10. The first course data includes a course point 101, a travel course 102, a target position of the unmanned haul vehicle 10, a target azimuth of the unmanned haul vehicle 10, and a target traveling speed of the unmanned haul vehicle 10.

A plurality of course points 101 is set on the travel path 36 including the intersection 37. In addition, a plurality of course points 101 is set in each of the loading area 31, the discharging area 32, the parking area 33, and the fuel filling area 34. The course point 101 defines a target position of the unmanned haul vehicle 10. A target azimuth and a target traveling speed of the unmanned haul vehicle 10 are set for each of the plurality of course points 101. The plurality of course points 101 is set at intervals. The interval between the course points 101 is set to, for example, 1 [m] or more and 5 [m] or less. The intervals between the course points 101 may be uniform or non-uniform.

The travel course 102 refers to a virtual line indicating a target travel path of the unmanned haul vehicle 10. The travel course 102 is defined by a trajectory passing through the plurality of course points 101. The unmanned haul vehicle 10 travels through the work site along the travel course 102.

The target position of the unmanned haul vehicle 10 refers to a target position of the unmanned haul vehicle 10 when passing through the course point 101. The target position of the unmanned haul vehicle 10 may be defined in a local coordinate system of the unmanned haul vehicle 10 or may be defined in a global coordinate system.

The target azimuth of the unmanned haul vehicle 10 refers to a target azimuth of the unmanned haul vehicle 10 when passing through the course point 101.

The target traveling speed of the unmanned haul vehicle 10 refers to a target traveling speed of the unmanned haul vehicle 10 when passing through the course point 101. The target traveling speed of the unmanned haul vehicle 10 includes an upper limit speed (limit speed) indicating an upper limit of the traveling speed of the unmanned haul vehicle 10. The unmanned haul vehicle 10 travels at a traveling speed not exceeding the upper limit speed at the work site.

Figure 7:
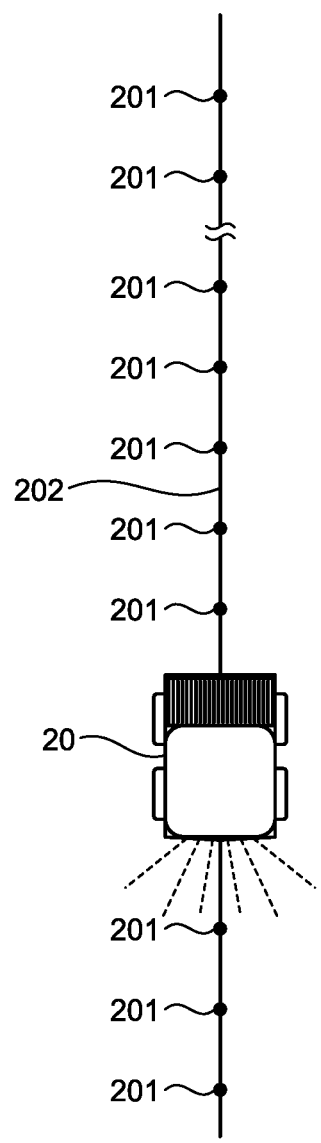
FIG. 7 is a diagram for explaining second course data of the unmanned sprinkling vehicle according to the embodiment.

FIG. 7 is a diagram for explaining second course data of the unmanned sprinkling vehicle 20 according to the embodiment. The second course data defines a traveling condition of the unmanned sprinkling vehicle 20. The second course data includes a course point 201, a travel course 202, a target position of the unmanned sprinkling vehicle 20, a target azimuth of the unmanned sprinkling vehicle 20, and a target traveling speed of the unmanned sprinkling vehicle 20.

A plurality of course points 201 is set on the travel path 36 including the intersection 37. In addition, a plurality of course points 201 is set in each of the loading area 31, the discharging area 32, the parking area 33, the fuel filling area 34, and the water supply area 35. The course point 201 defines a target position of the unmanned sprinkling vehicle 20. A target azimuth and a target traveling speed of the unmanned sprinkling vehicle 20 are set for each of the plurality of course points 201. The plurality of course points 201 is set at intervals. The interval between the course points 201 is set to, for example, 1 [m] or more and 5 [m] or less. The intervals between the course points 201 may be uniform or non-uniform.

The travel course 202 refers to a virtual line indicating a target travel path of the unmanned sprinkling vehicle 20. The travel course 202 is defined by a trajectory passing through the plurality of course points 201. The unmanned sprinkling vehicle 20 travels through the work site along the travel course 202.

The target position of the unmanned sprinkling vehicle 20 refers to a target position of the unmanned sprinkling vehicle 20 when passing through the course point 201. The target position of the unmanned sprinkling vehicle 20 may be defined in a local coordinate system of the unmanned sprinkling vehicle 20 or may be defined in a global coordinate system.

The target azimuth of the unmanned sprinkling vehicle 20 refers to a target azimuth of the unmanned sprinkling vehicle 20 when passing through the course point 201.

The target traveling speed of the unmanned sprinkling vehicle 20 refers to a target traveling speed of the unmanned sprinkling vehicle 20 when passing through the course point 201. The target traveling speed of the unmanned sprinkling vehicle 20 includes an upper limit speed (speed limit) indicating an upper limit of the traveling speed of the unmanned sprinkling vehicle 20. The unmanned sprinkling vehicle 20 travels at a traveling speed not exceeding the upper limit speed at the work site.

The inter-vehicle distance determination unit 63 determines an inter-vehicle distance L between the unmanned sprinkling vehicle 20 and the unmanned haul vehicle 10 traveling behind the unmanned sprinkling vehicle 20 in the same direction as the unmanned sprinkling vehicle 20 based on the sprinkling state from the sprinkling spray 28 provided in the unmanned sprinkling vehicle 20 traveling the work site.

The inter-vehicle distance determination unit 63 determines the inter-vehicle distance L so as to be longer than the distance at which sprinkling by the sprinkling spray 28 reaches the unmanned haul vehicle 10. The inter-vehicle distance determination unit 63 determines the inter-vehicle distance L so that the water sprayed from the sprinkling spray 28 and before being falling on the road surface is not directly splashed on the unmanned haul vehicle 10.

In the embodiment, the inter-vehicle distance determination unit 63 determines the inter-vehicle distance L based on the sprinkling state from the sprinkling spray 28 and one or both of the traveling speed of the unmanned haul vehicle 10 and the traveling speed of the unmanned sprinkling vehicle 20. The traveling speed of the unmanned haul vehicle 10 may be a target traveling speed defined by the first course data, or may be a detected traveling speed detected by the speed sensor 15C. Similarly, the traveling speed of the unmanned sprinkling vehicle 20 may be a target traveling speed defined by the second course data, or may be a detected traveling speed detected by the speed sensor 25C. The inter-vehicle distance determination unit 63 determines the inter-vehicle distance L so as to be longer than a distance obtained by adding a braking distance of the unmanned haul vehicle 10 to a distance that sprinkling by the sprinkling spray 28 reaches. In a case where the traveling speed of the unmanned haul vehicle 10 is high, the braking distance of the unmanned haul vehicle 10 becomes long. In a case where the traveling speed of the unmanned haul vehicle 10 is low, the braking distance of the unmanned haul vehicle 10 becomes short.

The sprinkling data generation unit 64 generates sprinkling data for controlling the sprinkling spray 28. The sprinkling data includes at least one of execution and stop of sprinkling from the sprinkling spray 28, a sprinkling position where the sprinkling spray 28 sprinkles at the work site, and a sprinkling amount per unit area from the sprinkling spray 28. The sprinkling position at which the sprinkling spray 28 sprinkles includes a sprinkling area indicating an area in the travel path 36 (work site) to be sprinkled from the sprinkling spray 28. In addition, in a case where a plurality of the sprinkling spray 28 is provided in the unmanned sprinkling vehicle 20, the sprinkling data includes the number of the sprinkling sprays 28 that execute sprinkling. In addition, in a case where the sprinkling spray 28 is installed at each of a plurality of positions of the unmanned sprinkling vehicle 20, the sprinkling data includes an installation position of the sprinkling spray 28 that executes sprinkling. The sprinkling data generation unit 64 may generate the sprinkling data based on the input data from the input device 9.

The sprinkling state from the sprinkling spray 28 is defined by the sprinkling data. The inter-vehicle distance determination unit 63 can acquire the sprinkling state from the sprinkling spray 28 by acquiring the sprinkling data generated by the sprinkling data generation unit 64.

The first output unit 65 outputs the first course data generated by the first course data generation unit 61 to the unmanned haul vehicle 10. The first output unit 65 transmits the first course data from the communication interface 41 to the control device 11 of the unmanned haul vehicle 10.

The first output unit 65 outputs the inter-vehicle distance data indicating the inter-vehicle distance L determined by the inter-vehicle distance determination unit 63 to the unmanned haul vehicle 10. The first output unit 65 transmits the inter-vehicle distance data from the communication interface 41 to the control device 11 of the unmanned haul vehicle 10.

The second output unit 66 outputs the second course data generated by the second course data generation unit 62 to the unmanned sprinkling vehicle 20. The second output unit 66 transmits the second course data from the communication interface 41 to the control device 21 of the unmanned sprinkling vehicle 20.

The second output unit 66 outputs the sprinkling data generated by the sprinkling data generation unit 64 to the unmanned sprinkling vehicle 20. The second output unit 66 transmits the sprinkling data from the communication interface 41 to the control device 21 of the unmanned sprinkling vehicle 20.

The control device 11 includes a computer system. Similarly to the management device 2, the control device 11 includes a communication interface, a storage circuit, and a processing circuit. The control device 11 includes a travel control unit 71 that controls the traveling device 13. The travel control unit 71 controls the traveling device 13 based on the first course data transmitted from the management device 2. The travel control unit 71 controls the traveling device 13 based on the inter-vehicle distance data transmitted from the management device 2.

The control device 21 includes a computer system. Similarly to the management device 2, the control device 21 includes a communication interface, a storage circuit, and a processing circuit. The control device 21 includes a travel control unit 81 that controls the traveling device 23 and a sprinkling control unit 82 that controls the sprinkling spray 28. The travel control unit 81 controls the traveling device 23 based on the second course data transmitted from the management device 2. The sprinkling control unit 82 controls the sprinkling spray 28 based on the sprinkling data transmitted from the management device 2.

The travel control unit 71 controls the traveling device 13 based on the first course data and the detection data of the sensor system 15. The travel control unit 71 controls the traveling device 13 such that the unmanned haul vehicle 10 travels along the travel course 102 based on the detection data of the position sensor 15A and the detection data of the azimuth sensor 15B.

That is, the travel control unit 71 controls the traveling device 13 so that the deviation between the detected position of the unmanned haul vehicle 10 detected by the position sensor 15A when passing through the course point 101 and the target position of the unmanned haul vehicle 10 set at the course point 101 becomes small.

In addition, the travel control unit 71 controls the traveling device 13 so that the deviation between the detected azimuth of the unmanned haul vehicle 10 detected by the azimuth sensor 15B when passing through the course point 101 and the target azimuth of the unmanned haul vehicle 10 set at the course point 101 becomes small.

In addition, the travel control unit 71 controls the traveling device 13 so that the unmanned haul vehicle 10 travels at the target traveling speed based on the detection data of the speed sensor 15C. That is, the travel control unit 71 controls the traveling device 13 so that the deviation between the detected traveling speed of the unmanned haul vehicle 10 detected by the speed sensor 15C when passing through the course point 101 and the target traveling speed of the unmanned haul vehicle 10 set at the course point 101 becomes small.

As described above, the target traveling speed of the unmanned haul vehicle 10 includes the upper limit speed of the unmanned haul vehicle 10. The travel control unit 71 controls the traveling device 13 so that the unmanned haul vehicle 10 travels at a traveling speed not exceeding the upper limit speed based on the detection data of the speed sensor 15C. That is, the travel control unit 71 controls the traveling device 13 so that the detected traveling speed of the unmanned haul vehicle 10 detected by the speed sensor 15C when passing through the course point 101 does not exceed the upper limit speed of the unmanned haul vehicle 10 set at the course point 101.

In addition, based on the inter-vehicle distance data transmitted from the management device 2, the travel control unit 71 controls the traveling device 13 so that the inter-vehicle distance L between the unmanned haul vehicle 10 and the unmanned sprinkling vehicle 20 traveling in front of the unmanned haul vehicle 10 maintains the inter-vehicle distance L determined by the inter-vehicle distance determination unit 63.

The travel control unit 81 controls the traveling device 23 based on the second course data and the detection data of the sensor system 25. The travel control unit 81 controls the traveling device 23 so that the unmanned sprinkling vehicle 20 travels along the travel course 202 based on the detection data of the position sensor 25A and the detection data of the azimuth sensor 25B.

That is, the travel control unit 81 controls the traveling device 23 so that the deviation between the detected position of the unmanned sprinkling vehicle 20 detected by the position sensor 25A when passing through the course point 201 and the target position of the unmanned sprinkling vehicle 20 set at the course point 201 becomes small.

In addition, the travel control unit 81 controls the traveling device 23 so that the deviation between the detected azimuth of the unmanned sprinkling vehicle 20 detected by the azimuth sensor 25B when passing through the course point 201 and the target azimuth of the unmanned sprinkling vehicle 20 set at the course point 201 becomes small.

In addition, the travel control unit 81 controls the traveling device 23 so that the unmanned sprinkling vehicle 20 travels at the target traveling speed based on the detection data of the speed sensor 25C. That is, the travel control unit 81 controls the traveling device 23 so that the deviation between the detected traveling speed of the unmanned sprinkling vehicle 20 detected by the speed sensor 25C when passing through the course point 201 and the target traveling speed of the unmanned sprinkling vehicle 20 set at the course point 201 becomes small.

As described above, the target traveling speed of the unmanned sprinkling vehicle 20 includes the upper limit speed of the unmanned sprinkling vehicle 20. The travel control unit 81 controls the traveling device 23 so that the unmanned sprinkling vehicle 20 travels at a traveling speed not exceeding the upper limit speed based on the detection data of the speed sensor 25C. That is, the travel control unit 81 controls the traveling device 23 so that the detected traveling speed of the unmanned sprinkling vehicle 20 detected by the speed sensor 25C when passing through the course point 201 does not exceed the upper limit speed of the unmanned sprinkling vehicle 20 set at the course point 201.

The sprinkling control unit 82 controls the sprinkling spray 28 based on the sprinkling data transmitted from the management device 2. The sprinkling state from the sprinkling spray is defined by the sprinkling data.

[Sprinkling State from Sprinkling Spray]

Figure 8:
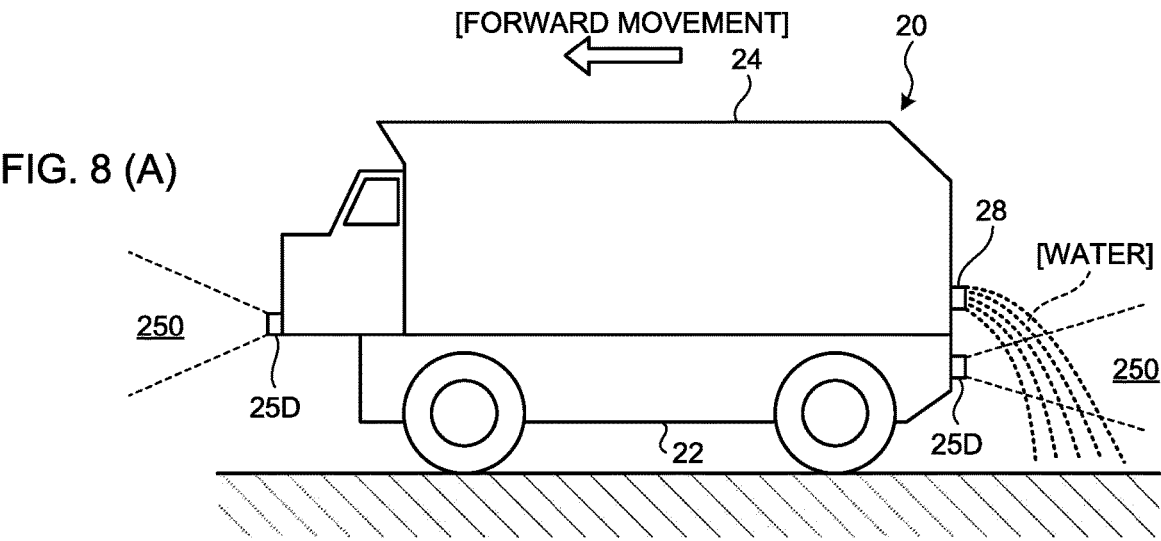
FIG. 8(A) and FIG. 8(B) are diagrams for explaining a sprinkling state from a sprinkling spray according to the embodiment.
Figure 8:
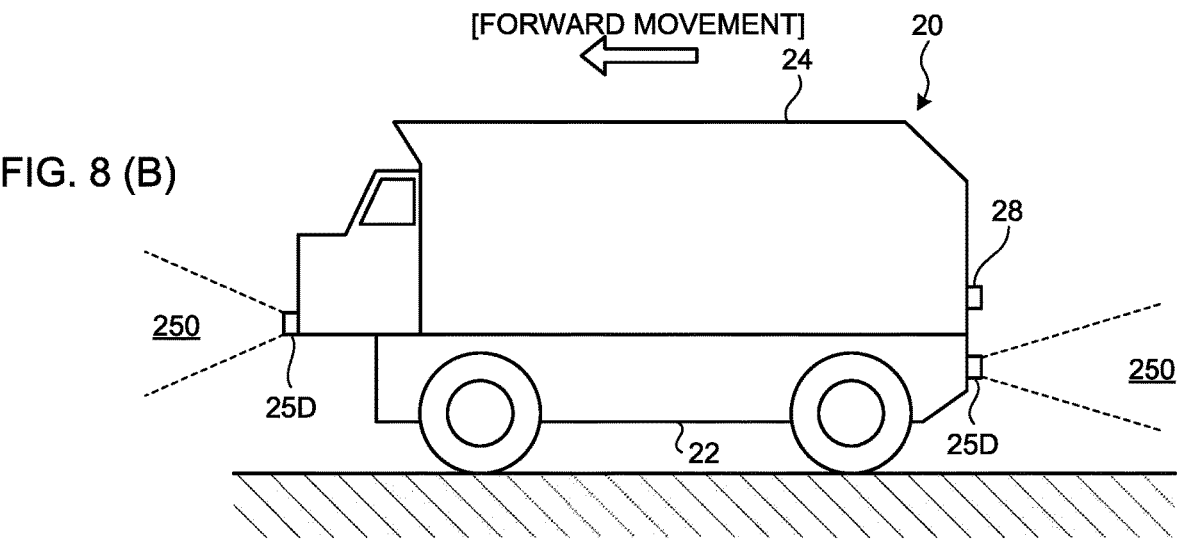

FIG. 8(A) and FIG. 8(B) are diagrams for explaining a sprinkling state from the sprinkling spray 28 according to the embodiment. As illustrated in FIG. 8(A) and FIG. 8(B), the sprinkling spray 28 is disposed at the rear portion of the unmanned sprinkling vehicle 20. The sprinkling spray 28 sprinkles behind the unmanned sprinkling vehicle 20 when the unmanned sprinkling vehicle 20 moves forward.

The sprinkling state from the sprinkling spray 28 includes executing and stopping the sprinkling by the sprinkling spray 28. FIG. 8(A) illustrates a state in which sprinkling by the sprinkling spray 28 is being executed. FIG. 8(B) illustrates a state in which sprinkling by the sprinkling spray 28 is stopped.

As illustrated in FIG. 8(A) and FIG. 8(B), the obstacle sensor 25D of the unmanned sprinkling vehicle 20 is attached to each of the front portion of the unmanned sprinkling vehicle 20 and the rear portion of the unmanned sprinkling vehicle 20. A detection area 250 of the obstacle sensor 25D attached to the front portion of the unmanned sprinkling vehicle 20 is defined in front of the unmanned sprinkling vehicle 20. The detection area 250 of the obstacle sensor 25D attached to the rear portion of the unmanned sprinkling vehicle 20 is defined behind the unmanned sprinkling vehicle 20. The obstacle sensor 25D detects an obstacle present in the detection area 250. When sprinkling by the sprinkling spray 28 is being executed while the unmanned sprinkling vehicle 20 is moving forward, the function of the obstacle sensor 25D attached to the rear portion may be stopped.

[Processing of Inter-Vehicle Distance Determination Unit]

Figure 9:
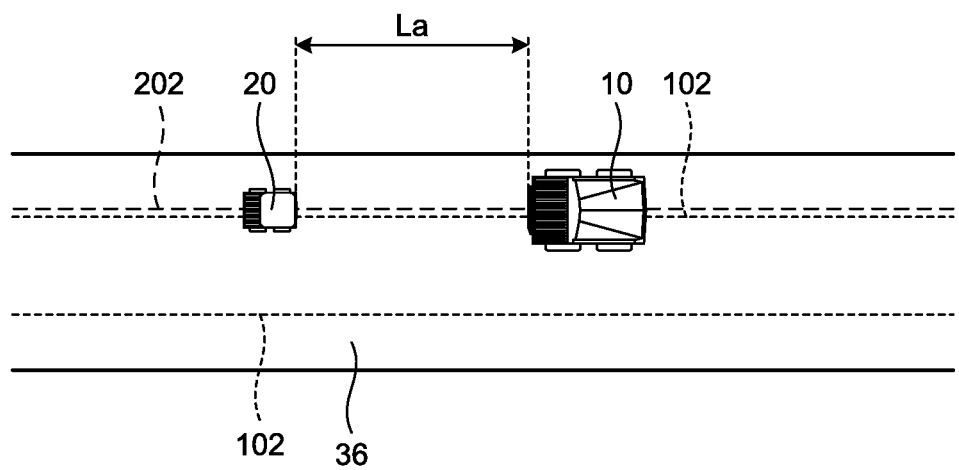
FIG. 9 is a diagram for explaining processing of an inter-vehicle distance determination unit according to the embodiment.
Figure 10:
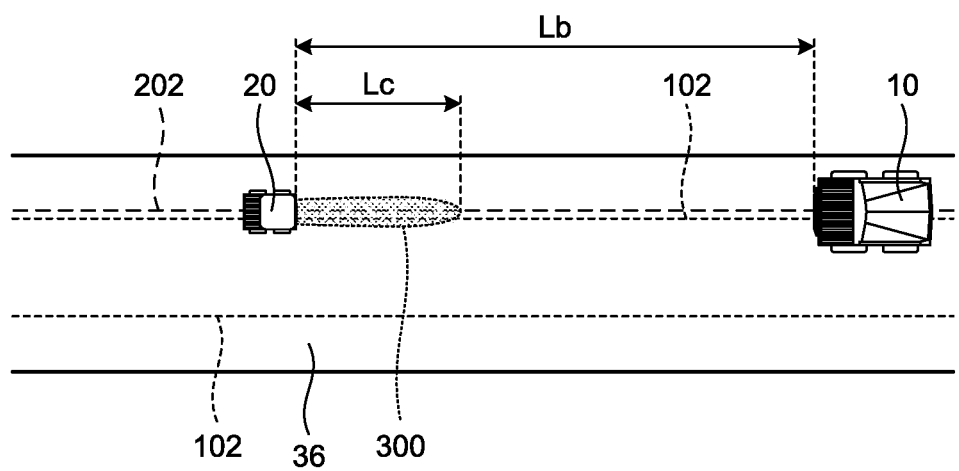
FIG. 10 is a diagram for explaining processing of an inter-vehicle distance determination unit according to the embodiment.

Each of FIGS. 9 and 10 is a diagram for explaining processing of the inter-vehicle distance determination unit 63 according to the embodiment. FIG. 9 illustrates an inter-vehicle distance La determined when sprinkling by the sprinkling spray 28 is stopped. FIG. 10 illustrates an inter-vehicle distance Lb determined when sprinkling by the sprinkling spray 28 is being executed.

As illustrated in FIGS. 9 and 10, the inter-vehicle distance L refers to an inter-vehicle distance between the unmanned sprinkling vehicle 20 and the unmanned haul vehicle 10 traveling behind the unmanned sprinkling vehicle 20 in the same direction as the unmanned sprinkling vehicle 20.

Traveling of the unmanned haul vehicle 10 behind the unmanned sprinkling vehicle 20 includes setting the travel course 102 of the unmanned haul vehicle 10 and the travel course 202 of the unmanned sprinkling vehicle 20 on the same travel path 36. In addition, traveling of the unmanned haul vehicle 10 behind the unmanned sprinkling vehicle 20 includes setting the travel course 102 and the travel course 202 in parallel or the travel course 102 and the travel course 202 to overlap each other in the same travel path 36.

As illustrated in FIGS. 9 and 10, the inter-vehicle distance determination unit 63 determines the inter-vehicle distance L such that the inter-vehicle distance Lb when the sprinkling by the sprinkling spray 28 is being executed is longer than the inter-vehicle distance La when the sprinkling by the sprinkling spray 28 is stopped.

The inter-vehicle distance La when the sprinkling is stopped is determined based on the braking distance of the unmanned haul vehicle 10. The inter-vehicle distance La is determined to be longer than the braking distance of the unmanned haul vehicle 10. As a result, in a case where the unmanned sprinkling vehicle 20 is suddenly stopped, the traveling device 13 of the unmanned haul vehicle 10 is braked, so that the interference between the unmanned haul vehicle 10 and the unmanned sprinkling vehicle 20 is suppressed.

The inter-vehicle distance Lb when the sprinkling is being executed is determined to be longer than the distance at which the sprinkling by the sprinkling spray 28 reaches the unmanned haul vehicle 10. The inter-vehicle distance Lb is determined to be longer than a distance obtained by adding a braking distance of the unmanned haul vehicle 10 to a distance that sprinkling by the sprinkling spray 28 reaches. The inter-vehicle distance Lb is determined based on, for example, the size of a sprinkling area 300 sprinkled from the sprinkling spray 28 and the braking distance of the unmanned haul vehicle 10. The sprinkling area 300 includes an area where the water sprayed from the sprinkling spray 28 floats in the air without falling onto the road surface. The inter-vehicle distance Lb is determined to be longer than the sum of the length Lc of the sprinkling area 300 in the traveling direction of the unmanned sprinkling vehicle 20 and the braking distance of the unmanned haul vehicle 10. As a result, in a case where the unmanned sprinkling vehicle 20 suddenly stops while sprinkling water, the traveling device 13 of the unmanned haul vehicle 10 is braked, so that the water sprayed from the sprinkling spray 28 is suppressed from directly splashing the unmanned haul vehicle 10.

Since the inter-vehicle distance Lb when the sprinkling by the sprinkling spray 28 is executed is long, the unmanned haul vehicle 10 traveling behind the unmanned sprinkling vehicle 20 is suppressed from traveling on the road surface immediately after being sprinkled. When the unmanned haul vehicle 10 travels on the road surface immediately after being sprinkled, there is a high possibility that the tires 17 of the unmanned haul vehicle slip, and there is a possibility that traveling of the unmanned haul vehicle 10 is hindered. In the embodiment, since the inter-vehicle distance Lb when sprinkling by the sprinkling spray 28 is executed is long, the tires 17 of the unmanned haul vehicle 10 are suppressed from slipping. Therefore, the unmanned haul vehicle 10 can travel smoothly.

In addition, since the inter-vehicle distance Lb when sprinkling by the sprinkling spray 28 is executed is long, it is possible to suppress water sprayed from the sprinkling spray 28 from being splashed on the obstacle sensor 15D provided in the front portion of the unmanned haul vehicle 10. Therefore, a decrease in detection accuracy of the obstacle sensor 15D is suppressed.

As described above, in a case where the sprinkling spray 28 is provided at the rear portion of the unmanned sprinkling vehicle 20, the sprinkling spray 28 is sprinkled toward the rear of the unmanned sprinkling vehicle 20, and the unmanned haul vehicle 10 travels in the same direction as the unmanned sprinkling vehicle 20 behind the unmanned sprinkling vehicle 20, the traveling device 13 of the unmanned haul vehicle 10 is controlled so that the inter-vehicle distance L between the unmanned sprinkling vehicle 20 and the unmanned haul vehicle 10 becomes long. As a result, the tires 17 of the unmanned haul vehicle 10 are suppressed from slipping, and the unmanned haul vehicle 10 can smoothly move forward.

Figure 11:
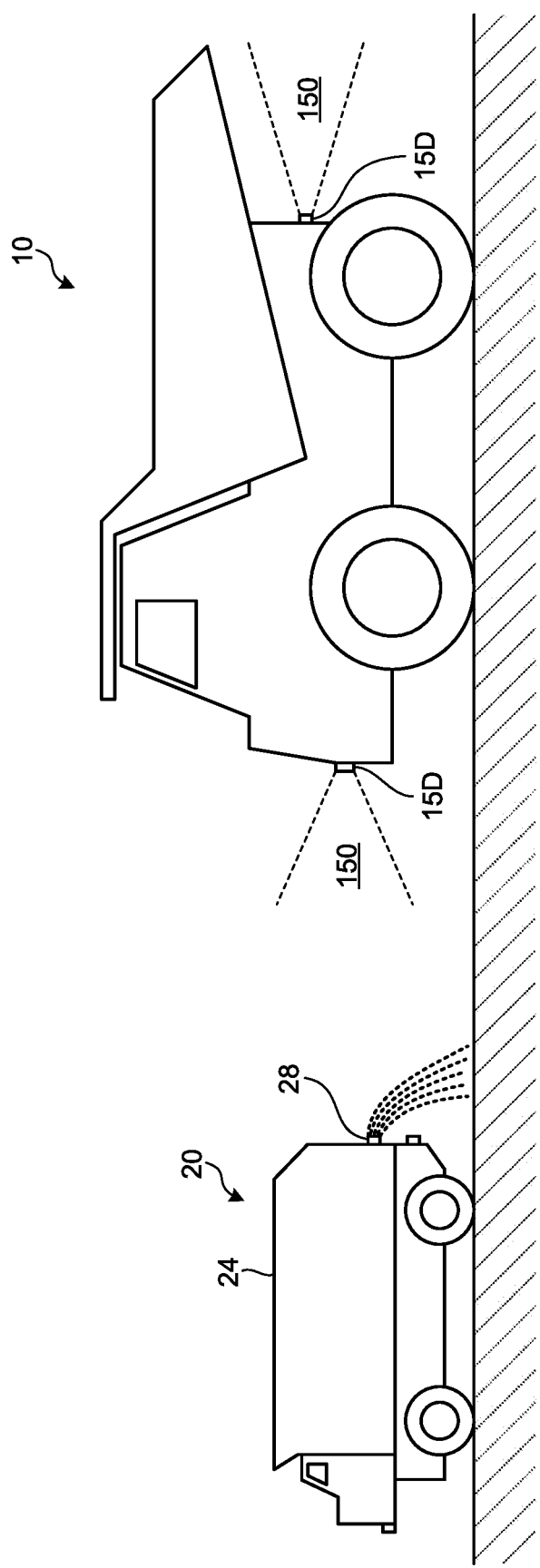
FIG. 11 is a diagram illustrating a relationship between the unmanned sprinkling vehicle and the unmanned haul vehicle according to the embodiment.

FIG. 11 is a diagram illustrating a relationship between the unmanned sprinkling vehicle 20 and the unmanned haul vehicle 10 according to the embodiment. As illustrated in FIG. 11, the obstacle sensor 15D of the unmanned haul vehicle 10 is attached to each of the front portion of the unmanned haul vehicle 10 and the rear portion of the unmanned haul vehicle 10. A detection area 150 of the obstacle sensor 15D attached to the front portion of the unmanned haul vehicle 10 is defined in front of the unmanned haul vehicle 10. The detection area 150 of the obstacle sensor 15D attached to the rear portion of the unmanned haul vehicle 10 is defined behind the unmanned haul vehicle 10. The obstacle sensor 15D detects an obstacle present in the detection area 150.

As illustrated in FIG. 11, when the water sprayed from the sprinkling spray 28 is splashed on the obstacle sensor 15D provided in the front portion of the unmanned haul vehicle 10 or enters the detection area 150 of the obstacle sensor 15D, there is a possibility that the detection accuracy of the obstacle sensor 15D decreases. In the embodiment, when sprinkling by the sprinkling spray 28 is executed, the traveling device 13 of the unmanned haul vehicle 10 is controlled so that the inter-vehicle distance L between the unmanned sprinkling vehicle 20 and the unmanned haul vehicle 10 becomes long. Therefore, since it is suppressed that the water sprayed from the sprinkling spray 28 is splashed on the obstacle sensor 15D provided in the front portion of the unmanned haul vehicle 10 or enters the detection area 150 of the obstacle sensor 15D, a decrease in the detection accuracy of the obstacle sensor 15D is suppressed.

In the embodiment, the inter-vehicle distance determination unit 63 determines, based on the position of the unmanned sprinkling vehicle 20, the position of the unmanned haul vehicle 10 so that the inter-vehicle distance L between the unmanned sprinkling vehicle 20 and the unmanned haul vehicle 10 becomes the inter-vehicle distance L determined based on the sprinkling state from the sprinkling spray 28. The position of the unmanned sprinkling vehicle 20 is detected by the position sensor 25A of the unmanned sprinkling vehicle 20. Based on the detection data of the position sensor 25A, the inter-vehicle distance determination unit 63 determines the position of the unmanned haul vehicle 10 so that the inter-vehicle distance L between the unmanned sprinkling vehicle 20 and the unmanned haul vehicle 10 becomes the inter-vehicle distance L determined based on the sprinkling state from the sprinkling spray 28. The inter-vehicle distance determination unit 63 outputs the determined position of the unmanned haul vehicle 10. The first output unit 65 transmits the position of the unmanned haul vehicle 10 determined by the inter-vehicle distance determination unit 63 from the communication interface 41 to the control device 11 of the unmanned haul vehicle 10. The travel control unit 71 of the unmanned haul vehicle 10 controls the traveling device 13 so that the deviation between the position of the unmanned haul vehicle 10 determined by the inter-vehicle distance determination unit 63 and the detected position of the unmanned haul vehicle 10 detected by the position sensor 15A becomes small.

For example, in a case where the sprinkling by the sprinkling spray 28 is stopped and the unmanned haul vehicle 10 is traveling behind the unmanned sprinkling vehicle 20 at the inter-vehicle distance La, and the sprinkling by the sprinkling spray 28 is started, the travel control unit 71 of the unmanned haul vehicle 10 decelerates the traveling device 13 so as to change from the inter-vehicle distance La to the inter-vehicle distance Lb.

For example, in a case where the sprinkling by the sprinkling spray 28 is being executed and the unmanned haul vehicle 10 is traveling behind the unmanned sprinkling vehicle 20 at the inter-vehicle distance Lb, and the sprinkling by the sprinkling spray 28 is stopped, the travel control unit 71 of the unmanned haul vehicle 10 accelerates the traveling device 13 so as to change from the inter-vehicle distance Lb to the inter-vehicle distance La.

Note that the inter-vehicle distance Lb may be determined, for example, such that water sprayed from the sprinkling spray 28 does not directly splash the unmanned haul vehicle 10.

[Unmanned Vehicle Management Method]

Figure 12:
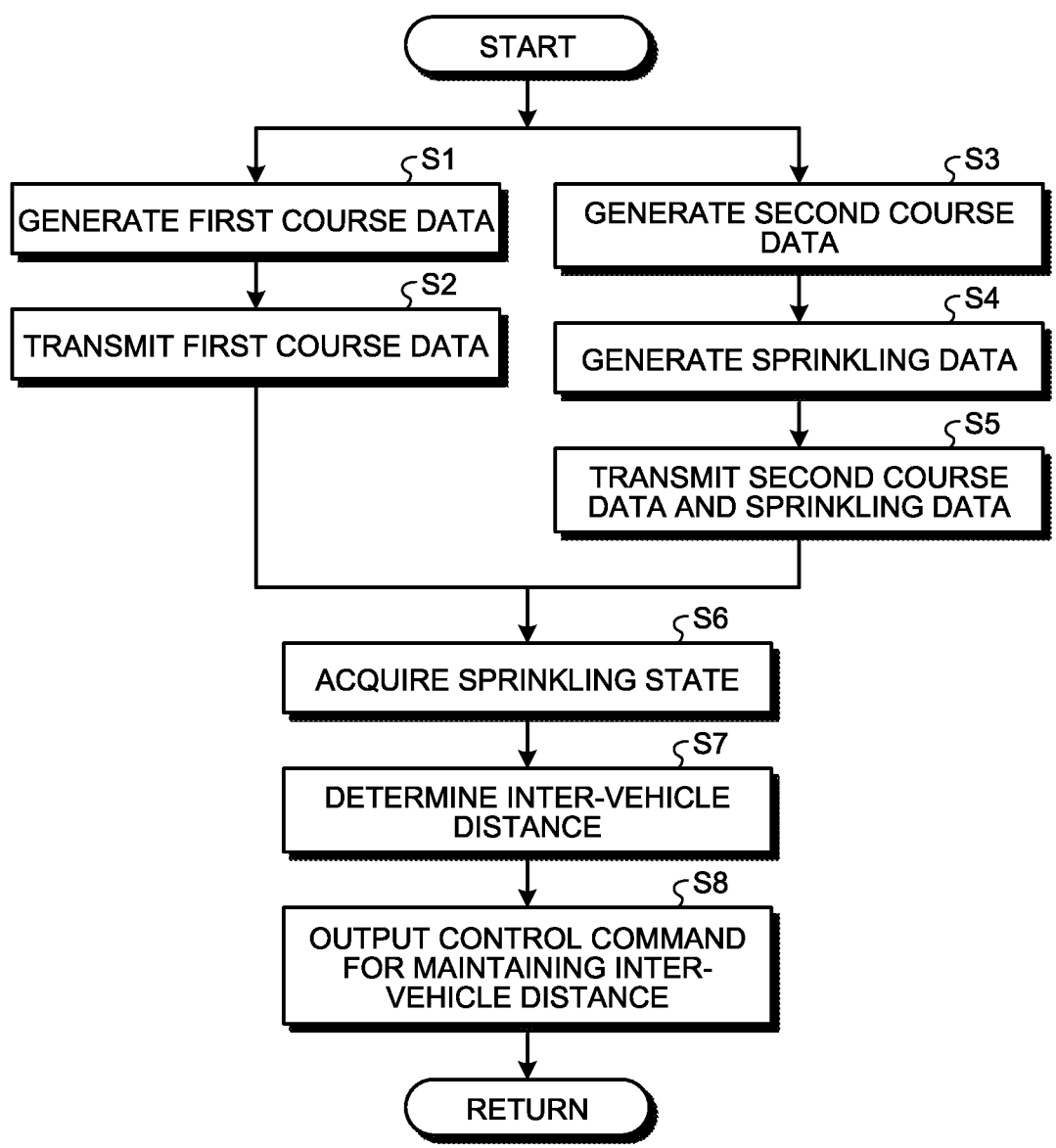
FIG. 12 is a flowchart illustrating an unmanned vehicle management method according to the embodiment.

FIG. 12 is a flowchart illustrating the unmanned vehicle management method according to the embodiment.

The first course data generation unit 61 generates first course data of the unmanned haul vehicle 10 (Step S1).

The first output unit 65 transmits the first course data generated by the first course data generation unit 61 to the unmanned haul vehicle 10 (Step S2).

The unmanned haul vehicle 10 travels on the travel path 36 based on the first course data.

The second course data generation unit 62 generates second course data of the unmanned sprinkling vehicle 20 (Step S3).

The sprinkling data generation unit 64 generates sprinkling data by the sprinkling spray 28 (Step S4).

Note that the processing of Step S4 may be executed before the processing of Step S3, or the processing of Step S4 may be executed in parallel with at least a part of the processing of Step S3.

The second output unit 66 transmits the second course data generated by the second course data generation unit 62 and the sprinkling data generated by the sprinkling data generation unit 64 to the unmanned sprinkling vehicle 20 (Step S5).

The unmanned sprinkling vehicle 20 travels on the travel path 36 based on the second course data. In addition, the sprinkling spray 28 executes sprinkling or stops sprinkling based on the sprinkling data.

The inter-vehicle distance determination unit 63 acquires the sprinkling state from the sprinkling spray 28 (Step S6).

The sprinkling state from the sprinkling spray 28 is defined by the sprinkling data generated by the sprinkling data generation unit 64. The inter-vehicle distance determination unit 63 can acquire the sprinkling state from the sprinkling spray 28 by acquiring the sprinkling data generated by the sprinkling data generation unit 64.

In a case where the unmanned haul vehicle 10 is traveling behind the unmanned sprinkling vehicle 20 in the travel path 36 in the same direction as the unmanned sprinkling vehicle 20, the inter-vehicle distance determination unit 63 determines the inter-vehicle distance L between the unmanned sprinkling vehicle 20 and the unmanned haul vehicle 10 based on the sprinkling state from the sprinkling spray 28 (Step S7).

As described with reference to FIGS. 9 and 10, in a case where the sprinkling by the sprinkling spray 28 is stopped, the inter-vehicle distance determination unit 63 determines the inter-vehicle distance L as the inter-vehicle distance La. In a case where sprinkling by the sprinkling spray 28 is being executed, the inter-vehicle distance determination unit 63 determines the inter-vehicle distance L to be the inter-vehicle distance Lb longer than the inter-vehicle distance La.

The first output unit 65 transmits the inter-vehicle distance data indicating the inter-vehicle distance L determined in Step S7 to the unmanned haul vehicle 10. The first output unit 65 outputs a control command for maintaining the determined inter-vehicle distance L to the unmanned sprinkling vehicle 20 (Step S8).

The travel control unit 71 of the unmanned haul vehicle 10 controls the traveling device 13 based on the inter-vehicle distance data transmitted from the management device 2.

Effects

As described above, according to the embodiment, the inter-vehicle distance L between the unmanned sprinkling vehicle 20 and the unmanned haul vehicle 10 is determined on the basis of the sprinkling state from the sprinkling spray 28.

In a case where sprinkling by the sprinkling spray 28 is executed, the inter-vehicle distance L between the unmanned sprinkling vehicle 20 and the unmanned haul vehicle 10 becomes long, so that the tires 17 of the unmanned haul vehicle 10 are suppressed from slipping, and the unmanned haul vehicle 10 can smoothly move forward. In addition, in a case where the sprinkling by the sprinkling spray 28 is executed, the inter-vehicle distance L between the unmanned sprinkling vehicle 20 and the unmanned haul vehicle 10 is increased, so that the water sprayed from the sprinkling spray 28 is suppressed from splashing the obstacle sensor 15D provided in the front portion of the unmanned haul vehicle 10 or entering the detection area 150 of the obstacle sensor 15D. Therefore, a decrease in detection accuracy of the obstacle sensor 15D is suppressed.

In a case where the sprinkling by the sprinkling spray 28 is stopped, the inter-vehicle distance L between the unmanned sprinkling vehicle 20 and the unmanned haul vehicle 10 becomes short. In a case where the sprinkling by the sprinkling spray 28 is stopped, it is suppressed that the inter-vehicle distance L between the unmanned sprinkling vehicle 20 and the unmanned haul vehicle 10 becomes unnecessarily long. The unmanned haul vehicle 10 can smoothly travel on the travel path 36, and a decrease in productivity at the work site is suppressed.

The travel control unit 71 controls the traveling device 13 such that the unmanned haul vehicle 10 maintains the inter-vehicle distance L based on the inter-vehicle distance L determined by the inter-vehicle distance determination unit 63.

For example, in a case where the sprinkling by the sprinkling spray 28 is stopped and the inter-vehicle distance L is determined to be the inter-vehicle distance La, the travel control unit 71 adjusts the inter-vehicle distance L set in front of the unmanned haul vehicle 10 to the inter-vehicle distance La of the first length. In a state in which the sprinkling by the sprinkling spray 28 is stopped, the road surface in front of the unmanned haul vehicle 10 is in a dry state, and thus, the braking distance of the unmanned haul vehicle 10 is suppressed from becoming long. In a case where the road surface is in a dry state, even if the inter-vehicle distance L set in front of the unmanned haul vehicle 10 is short, for example, in a case where the unmanned sprinkling vehicle 20 is stopped, the unmanned haul vehicle 10 traveling at the first traveling speed can stop at a position before the unmanned sprinkling vehicle 20 by braking of the traveling device 13.

For example, in a case where the sprinkling by the sprinkling spray 28 is executed and the inter-vehicle distance L is determined to be the inter-vehicle distance Lb, the travel control unit 71 adjusts the inter-vehicle distance L set in front of the unmanned haul vehicle 10 to the inter-vehicle distance Lb having a second length longer than the first length. In a state where sprinkling by the sprinkling spray 28 is being executed, the road surface in front of the unmanned haul vehicle 10 is in a wet state, and thus, there is a possibility that the braking distance of the unmanned haul vehicle 10 becomes long. In a case where the road surface is in a wet state, the inter-vehicle distance L set in front of the unmanned haul vehicle 10 is long, and thus, for example, in a case where the unmanned sprinkling vehicle 20 is stopped, the unmanned haul vehicle 10 traveling at the first traveling speed can stop at a position where the sprinkling from the sprinkling spray 28 does not reach by the braking of the traveling device 13.

Other Embodiments

Figure 13:
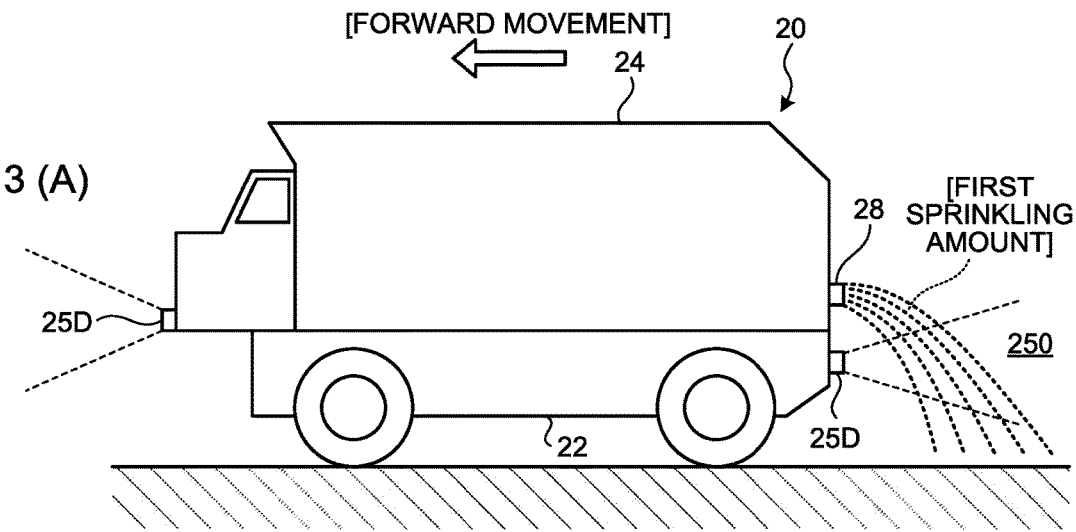
FIG. 13(A) and FIG. 13(B) are diagrams for explaining a sprinkling state from the sprinkling spray according to the embodiment.
Figure 13:
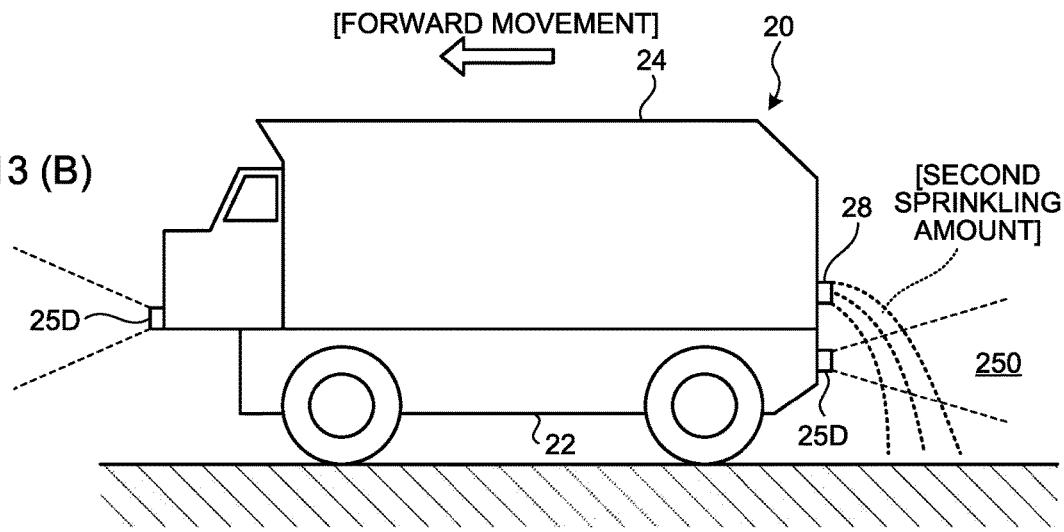

FIG. 13(A) and FIG. 13(B) are diagrams for explaining a sprinkling state from the sprinkling spray 28 according to the embodiment. In the above-described embodiment, the sprinkling state from the sprinkling spray 28 includes the execution of sprinkling by the sprinkling spray 28 and the stop of sprinkling. As illustrated in FIG. 13(A) and FIG. 13(B), the sprinkling state from the sprinkling spray 28 may include the sprinkling amount from the sprinkling spray 28. The sprinkling amount refers to a sprinkling amount per unit area sprinkled from the sprinkling spray 28. As illustrated in FIG. 13(A), the sprinkling control unit 82 can control the sprinkling spray 28 so that the sprinkling spray 28 is sprinkled with the first sprinkling amount. As illustrated in FIG. 13(B), the sprinkling control unit 82 can control the sprinkling spray 28 so that the sprinkling spray 28 is sprinkled with the second sprinkling amount smaller than the first sprinkling amount.

The inter-vehicle distance determination unit 63 can determine the inter-vehicle distance L such that the inter-vehicle distance Lb when sprinkled with the first sprinkling amount from the sprinkling spray 28 is longer than the inter-vehicle distance La when sprinkled with the second sprinkling amount smaller than the first sprinkling amount.

In a case where water is sprinkled from the sprinkling spray 28 with the first sprinkling amount, the inter-vehicle distance L between the unmanned sprinkling vehicle 20 and the unmanned haul vehicle 10 becomes long, so that the tires 17 of the unmanned haul vehicle 10 are suppressed from slipping, and the unmanned haul vehicle 10 can smoothly move forward. In addition, in a case where water is sprinkled from the sprinkling spray 28 with the first sprinkling amount, the inter-vehicle distance L between the unmanned sprinkling vehicle 20 and the unmanned haul vehicle 10 becomes long, so that it is suppressed that the water sprayed from the sprinkling spray 28 splashes the obstacle sensor 15D provided in the front portion of the unmanned haul vehicle 10 or enters the detection area 150 of the obstacle sensor 15D. Therefore, a decrease in detection accuracy of the obstacle sensor 15D is suppressed.

In a case where water is sprinkled from the sprinkling spray 28 with the second sprinkling amount, the inter-vehicle distance L between the unmanned sprinkling vehicle 20 and the unmanned haul vehicle 10 becomes short. In a case where water is sprinkled from the sprinkling spray 28 with the second sprinkling amount, the inter-vehicle distance L between the unmanned sprinkling vehicle 20 and the unmanned haul vehicle 10 is suppressed from becoming unnecessarily long. The unmanned haul vehicle 10 can smoothly travel on the travel path 36, and a decrease in productivity at the work site is suppressed.

Figure 14:
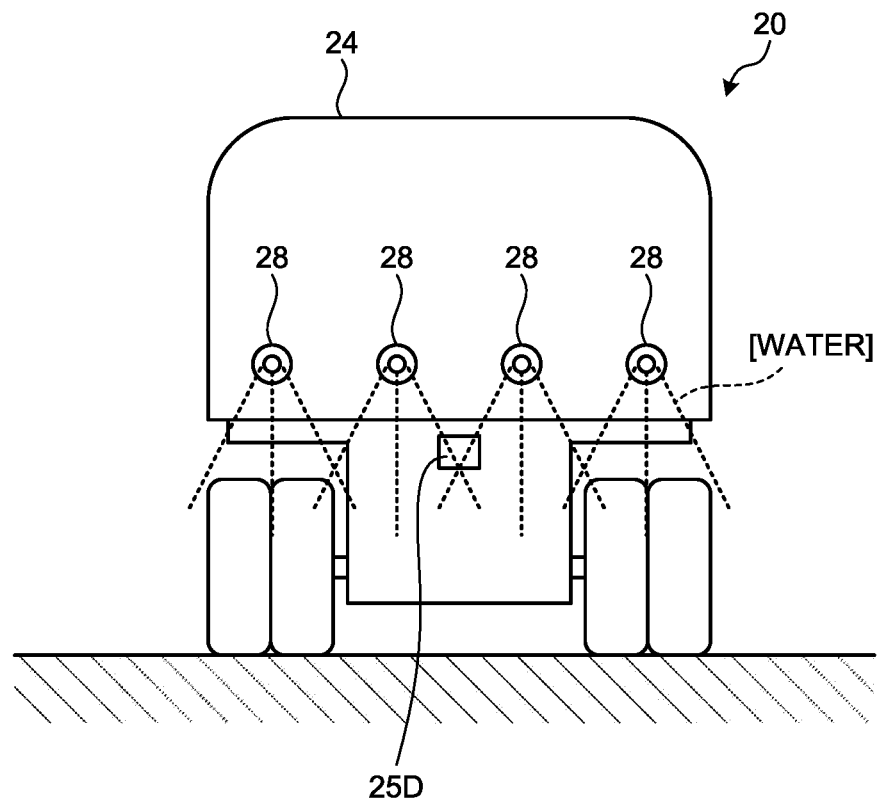
FIG. 14(A) and FIG. 14(B) are diagrams for explaining a sprinkling state from the sprinkling spray according to the embodiment.
Figure 14:
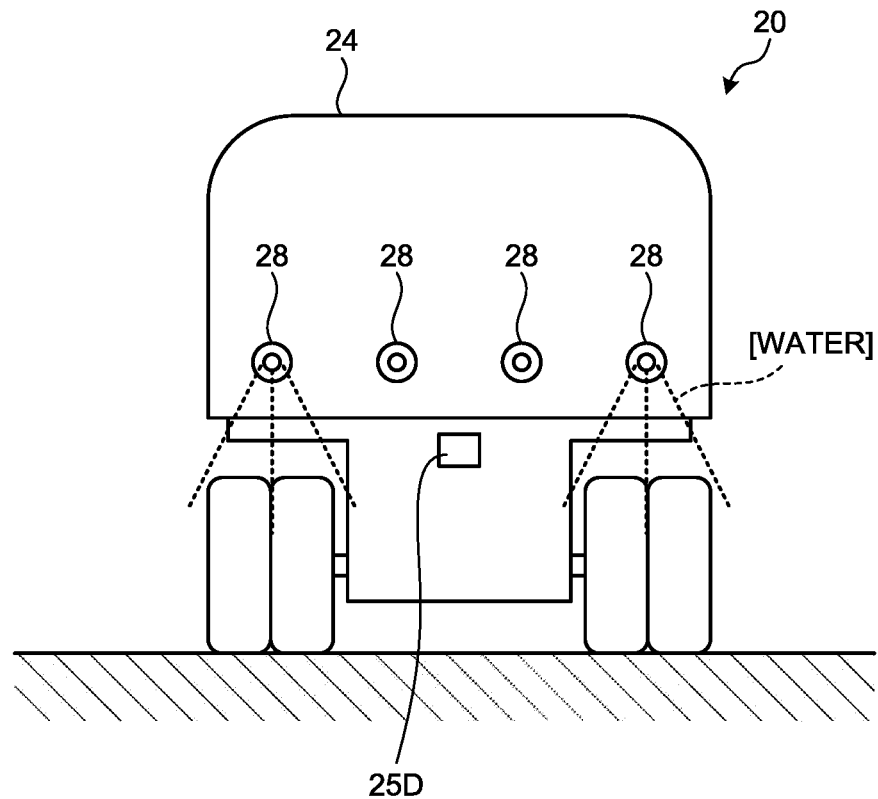

FIG. 14(A) and FIG. 14(B) are diagrams for explaining a sprinkling state from the sprinkling spray 28 according to the embodiment. As illustrated in FIG. 14(A) and FIG. 14(B), a plurality of sprinkling sprays 28 is provided at the rear portion of the unmanned sprinkling vehicle 20. The sprinkling spray 28 is installed at each of a plurality of positions in the vehicle width direction of the unmanned sprinkling vehicle 20 at the rear portion of the unmanned sprinkling vehicle 20. In the example illustrated in FIG. 14(A) and FIG. 14(B), the plurality of sprinkling sprays 28 is arranged at intervals in the vehicle width direction at the rear portion of the unmanned sprinkling vehicle 20. The obstacle sensor 25D is disposed at the central portion in the vehicle width direction.

The sprinkling state from the sprinkling spray 28 includes the number of sprinkling sprays 28 that execute sprinkling. In addition, the sprinkling state from the sprinkling spray 28 includes the installation position of the sprinkling spray 28 that executes sprinkling. As illustrated in FIG. 14(A), the sprinkling control unit 82 can control the sprinkling spray 28 so that the first number of sprinkling spray 28 is sprinkled. In the example illustrated in FIG. 14(A), the first number is four. In addition, the sprinkling control unit 82 can control the sprinkling spray 28 so that the sprinkling spray 28 is sprinkled at least from the sprinkling installed at the central portion in the vehicle width direction of the unmanned sprinkling vehicle 20. As illustrated in FIG. 14(B), the sprinkling control unit 82 can control the sprinkling spray 28 so that the second number of sprinkling spray 28, which is smaller than the first number, is sprinkled. In the example illustrated in FIG. 14(B), the second number is two. In addition, the sprinkling control unit 82 can control the sprinkling spray 28 so that water is sprinkled from the sprinkling spray 28 installed at the end portion in the vehicle width direction of the unmanned sprinkling vehicle 20.

The inter-vehicle distance determination unit 63 determines the inter-vehicle distance L such that the inter-vehicle distance Lb when sprinkled from the first number of sprinkling sprays 28 is longer than the inter-vehicle distance La when sprinkled from the second number of sprinkling sprays 28 smaller than the first number.

In a case where water is sprinkled from the first number of sprinkling sprays 28, the inter-vehicle distance L between the unmanned sprinkling vehicle 20 and the unmanned haul vehicle 10 becomes long, so that the tires 17 of the unmanned haul vehicle 10 are suppressed from slipping, and the unmanned haul vehicle 10 can smoothly move forward. In addition, in a case where water is sprinkled from the first number of sprinkling sprays 28, the inter-vehicle distance L between the unmanned sprinkling vehicle 20 and the unmanned haul vehicle 10 becomes long, so that it is possible to suppress water sprayed from the sprinkling spray 28 from splashing the obstacle sensor 15D provided in the front portion of the unmanned haul vehicle 10 or entering the detection area 150 of the obstacle sensor 15D. Therefore, a decrease in detection accuracy of the obstacle sensor 15D is suppressed.

In a case where water is sprinkled from the second number of sprinkling sprays 28, the inter-vehicle distance L between the unmanned sprinkling vehicle 20 and the unmanned haul vehicle 10 becomes short. In a case where water is sprinkled from the second number of sprinkling sprays 28, the inter-vehicle distance L between the unmanned sprinkling vehicle 20 and the unmanned haul vehicle 10 is suppressed from becoming unnecessarily long. The unmanned haul vehicle 10 can smoothly travel on the travel path 36, and a decrease in productivity at the work site is suppressed.

The inter-vehicle distance determination unit 63 determines the inter-vehicle distance L such that the inter-vehicle distance Lb when the installation position of the sprinkling spray 28 that executes sprinkling is the central portion in the vehicle width direction of the unmanned sprinkling vehicle 20 is longer than the inter-vehicle distance La when the installation position of the sprinkling spray 28 that executes sprinkling is the end portion in the vehicle width direction of the unmanned sprinkling vehicle 20.

In a case where the installation position of the sprinkling spray 28 for executing sprinkling is the central portion in the vehicle width direction of the unmanned sprinkling vehicle 20, water is sprinkled to the central portion of the road surface. In a case where the installation position of the sprinkling spray 28 for executing sprinkling is the central portion in the vehicle width direction of the unmanned sprinkling vehicle 20, there is a high possibility that the tires 17 of the unmanned haul vehicle 10 slip. In addition, the obstacle sensor 15D is disposed at the central portion of the unmanned haul vehicle 10 in the vehicle width direction at the front portion of the unmanned haul vehicle 10. In a case where the installation position of the sprinkling spray 28 for executing sprinkling is the central portion in the vehicle width direction of the unmanned sprinkling vehicle 20, there is a high possibility that the water sprayed from the sprinkling spray 28 splashes the obstacle sensor 15D provided in the front portion of the unmanned haul vehicle 10 or enters the detection area 150 of the obstacle sensor 15D. In a case where the installation position of the sprinkling spray 28 for executing sprinkling is the central portion in the vehicle width direction of the unmanned sprinkling vehicle 20, the inter-vehicle distance L between the unmanned sprinkling vehicle 20 and the unmanned haul vehicle 10 becomes long, so that the tires 17 of the unmanned haul vehicle 10 are suppressed from slipping, and the unmanned haul vehicle 10 can smoothly move forward. In addition, in a case where the installation position of the sprinkling spray 28 for executing sprinkling is the central portion in the vehicle width direction of the unmanned sprinkling vehicle 20, the inter-vehicle distance L between the unmanned sprinkling vehicle 20 and the unmanned haul vehicle 10 is increased, so that it is suppressed that the water sprayed from the sprinkling spray 28 splashes the obstacle sensor 15D provided in the front portion of the unmanned haul vehicle 10 or enters the detection area 150 of the obstacle sensor 15D. Therefore, a decrease in detection accuracy of the obstacle sensor 15D is suppressed.

In a case where the installation position of the sprinkling spray 28 for executing sprinkling is the end portion in the vehicle width direction of the unmanned sprinkling vehicle 20, water is sprinkled to the end portion of the road surface. In a case where the installation position of the sprinkling spray 28 for executing sprinkling is the end portion in the vehicle width direction of the unmanned sprinkling vehicle 20, slip of the tires 17 of the unmanned haul vehicle 10 is suppressed. In addition, the obstacle sensor 15D is disposed at the central portion of the unmanned haul vehicle 10 in the vehicle width direction at the front portion of the unmanned haul vehicle 10. In a case where the installation position of the sprinkling spray 28 for executing sprinkling is the end portion in the vehicle width direction of the unmanned sprinkling vehicle 20, it is possible to suppress water sprayed from the sprinkling spray 28 from splashing the obstacle sensor 15D provided in the front portion of the unmanned haul vehicle 10 or entering the detection area 150 of the obstacle sensor 15D. In a case where the installation position of the sprinkling spray 28 for executing sprinkling is the end portion in the vehicle width direction of the unmanned sprinkling vehicle 20, the inter-vehicle distance L between the unmanned sprinkling vehicle 20 and the unmanned haul vehicle 10 becomes short. In a case where the installation position of the sprinkling spray 28 for executing sprinkling is the end portion in the vehicle width direction of the unmanned sprinkling vehicle 20, an unnecessary increase in the inter-vehicle distance L between the unmanned sprinkling vehicle 20 and the unmanned haul vehicle 10 is suppressed. The unmanned haul vehicle 10 can smoothly travel on the travel path 36, and a decrease in productivity at the work site is suppressed.

In the above-described embodiment, the first course data may not be generated. The unmanned haul vehicle 10 may travel on the travel path 36 not based on the first course data. In the above-described embodiment, the second course data may not be generated. The unmanned sprinkling vehicle 20 may travel on the travel path 36 not based on the second course data.

In the above-described embodiment, at least a part of the function of the control device 11 and the function of the control device 21 may be provided in the management device 2, or at least a part of the function of the management device 2 may be provided in one or both of the control device 11 and the control device 21. For example, in the above-described embodiment, the control device 11 may have the function of the first course data generation unit 61 and the function of the inter-vehicle distance determination unit 63. The control device 21 may have the function of the second course data generation unit 62 and the function of the sprinkling data generation unit 64.

In the above-described embodiment, each of the first course data generation unit 61, the second course data generation unit 62, the inter-vehicle distance determination unit 63, the sprinkling data generation unit 64, the first output unit 65, and the second output unit 66 may be configured by separate hardware.

In the above-described embodiment, the first unmanned vehicle 10 is an unmanned haul vehicle, and the second unmanned vehicle 20 is an unmanned sprinkling vehicle. The first unmanned vehicle 10 may be an unmanned sprinkling vehicle.

REFERENCE SIGNS LIST

1 MANAGEMENT SYSTEM
2 MANAGEMENT DEVICE
3 COMMUNICATION SYSTEM
3A WIRELESS COMMUNICATION DEVICE
3B WIRELESS COMMUNICATION DEVICE
3C WIRELESS COMMUNICATION DEVICE
4 CONTROL FACILITY
5 LOADER
6 CRUSHER
7 OIL FEEDER
8 WATER SUPPLIER
9 INPUT DEVICE
10 UNMANNED HAUL VEHICLE (UNMANNED VEHICLE)
11 CONTROL DEVICE
12 VEHICLE BODY
13 TRAVELING DEVICE
14 DUMP BODY
15 SENSOR SYSTEM
15A POSITION SENSOR
15B AZIMUTH SENSOR
15C SPEED SENSOR
15D OBSTACLE SENSOR
16 WHEEL
16F FRONT WHEEL
16R REAR WHEEL
17 TIRE
17F FRONT TIRE
17R REAR TIRE
20 UNMANNED SPRINKLING VEHICLE (SPRINKLING VEHICLE)
21 CONTROL DEVICE
22 VEHICLE BODY
23 TRAVELING DEVICE
24 TANK
25 SENSOR SYSTEM
25A POSITION SENSOR
25B AZIMUTH SENSOR
25C SPEED SENSOR
25D OBSTACLE SENSOR
26 WHEEL
26F FRONT WHEEL
26R REAR WHEEL
27 TIRE
27F FRONT TIRE
27R REAR TIRE
28 SPRINKLING SPRAY
29 CAB
31 LOADING AREA
32 DISCHARGING AREA
33 PARKING AREA
34 FUEL FILLING AREA
35 WATER SUPPLY AREA
36 TRAVEL PATH
37 INTERSECTION
41 COMMUNICATION INTERFACE
42 STORAGE CIRCUIT
43 PROCESSING CIRCUIT
61 FIRST COURSE DATA GENERATION UNIT
62 SECOND COURSE DATA GENERATION UNIT
63 INTER-VEHICLE DISTANCE DETERMINATION UNIT
64 SPRINKLING DATA GENERATION UNIT
65 FIRST OUTPUT UNIT
66 SECOND OUTPUT UNIT
71 TRAVEL CONTROL UNIT
81 TRAVEL CONTROL UNIT
82 SPRINKLING CONTROL UNIT
101 COURSE POINT
102 TRAVEL COURSE
150 DETECTION AREA
201 COURSE POINT
202 TRAVEL COURSE
250 DETECTION AREA
300 SPRINKLING AREA

The invention claimed is:

1. An unmanned vehicle management method in a work site where a sprinkling vehicle configured to travel and sprinkle from a sprinkling spray provided in the sprinkling vehicle, and an unmanned vehicle configured to travel behind the sprinkling vehicle in a same direction as that of the sprinkling vehicle; comprising:

calculating an inter-vehicle distance between the sprinkling vehicle and the unmanned vehicle to be longer than a distance calculated by adding a braking distance of the unmanned vehicle to a distance that sprinkling by the sprinkling spray reaches based on a sprinkling state from a sprinkling spray;

outputting inter-vehicle distance data indicating the inter-vehicle distance to the unmanned vehicle to set the inter-vehicle distance, and controlling the unmanned vehicle according to the calculated inter-vehicle distance between the sprinkling vehicle and the unmanned vehicle.

2. The unmanned vehicle management method according to claim 1, wherein the sprinkling spray is disposed at a rear portion of the sprinkling vehicle, and sprinkles water behind the sprinkling vehicle while the sprinkling vehicle moves forward.

3. The unmanned vehicle management method according to claim 1, comprising
controlling a traveling device of the unmanned vehicle such that the unmanned vehicle maintains the inter-vehicle distance.

4. The unmanned vehicle management method according to claim 1,
wherein the inter-vehicle distance is longer than a distance by which sprinkling by the sprinkling spray reaches the unmanned vehicle.

5. The unmanned vehicle management method according to claim 1,
wherein an inter-vehicle distance set while sprinkling by the sprinkling spray is being executed is longer than an inter-vehicle distance set while sprinkling by the sprinkling is stopped.

6. The unmanned vehicle management method according to claim 1,
wherein an inter-vehicle distance set while water is sprinkled from the sprinkling spray with a first sprinkling amount is longer than an inter-vehicle distance when water is sprinkled with a second sprinkling amount smaller than the first sprinkling amount.

7. The unmanned vehicle management method according to claim 1,
wherein a plurality of the sprinkling spray is provided, and
an inter-vehicle distance set while sprinkling is sprinkled from a first number of the sprinkling spray is longer than an inter-vehicle distance set while sprinkling sprinkled from a second number of the sprinkling spray less than the first number.

8. The unmanned vehicle management method according to claim 1,
wherein the sprinkling spray is installed at each of a plurality of positions in a vehicle width direction of the sprinkling vehicle, and
an inter-vehicle distance set while an installation position of the sprinkling spray is a central portion in the vehicle width direction is longer than an inter-vehicle distance set while the installation position is an end portion in the vehicle width direction.

9. An unmanned vehicle management system comprising:
a sprinkling vehicle configured to travel and sprinkle in a work site from a sprinkling spray provided in the sprinkling vehicle;
an unmanned vehicle configured to travel behind the sprinkling vehicle in a same direction as that of the sprinkling vehicle, and a processor as a processing circuit configured to:
calculate an inter-vehicle distance between a sprinkling vehicle and an unmanned vehicle based on a sprinkling state from the sprinkling spray, wherein the inter-vehicle distance is calculated to be longer than a distance obtained by adding a braking distance of the unmanned vehicle to a distance that sprinkling by the sprinkling spray reaches;
output, to the unmanned vehicle, inter-vehicle distance data indicating the calculated inter-vehicle-distance to set the inter-vehicle distance; and
control the unmanned vehicle according to the calculated inter-vehicle distance between the sprinkling vehicle and the unmanned vehicle.

10. The unmanned vehicle management system according to claim 9,
wherein the sprinkling spray is disposed at a rear portion of the sprinkling vehicle, and sprinkles water behind the sprinkling vehicle when the sprinkling vehicle moves forward.

11. The unmanned vehicle management system according to claim 9,
wherein the processor calculates the inter-vehicle distance to be a distance longer than a distance by which sprinkling by the sprinkling spray reaches the unmanned vehicle.

12. The unmanned vehicle management system according to claim 9,
wherein the sprinkling state includes a fist state where execution of sprinkling occurs and a second state where sprinkling is not executed, and
the processor calculates the inter-vehicle distance an inter-vehicle distance during the first state to be longer than an inter-vehicle distance during the second state.

13. The unmanned vehicle management system according to claim 9,
wherein the sprinkling state includes a first state sprinkling a first sprinkling amount from the sprinkling spray and a second state sprinkling a second sprinkling amount smaller than the first sprinkling amount, and
the processor calculates the inter-vehicle distance during the first sprinkling state to be longer than an inter-vehicle distance during the second sprinkling state.

14. The unmanned vehicle management system according to claim 9,
wherein a plurality of the sprinkling spray is provided,
the sprinkling state includes a first state where a first number of the sprinkling spray that executes sprinkling and a second state where a second number of the sprinkling spray that executes sprinkling, the second number of sprinkling spray being less than the first number of sprinkling spray, and
the processor calculates the inter-vehicle distance in the first state to be longer than an inter-vehicle distance in the second state.

15. The unmanned vehicle management system according to claim 9,
wherein the sprinkling spray is installed at each of a plurality of positions in a vehicle width direction of the sprinkling vehicle,
the sprinkling state includes a first state wherein an installation position of the sprinkling spray is a central portion in the vehicle width direction and a second state wherein the installation position of the sprinkling spray is an end portion in the vehicle width direction, and
the processor calculates the inter-vehicle distance in the first state to be longer than an inter-vehicle distance in the second state.

16. The unmanned vehicle management system according to claim 9, comprising
the processor further configured to control a traveling device of the unmanned vehicle,
wherein the processor is configured to control the traveling device such that the unmanned vehicle maintains the inter-vehicle distance.

17. The unmanned vehicle management system according to claim 9,
wherein the unmanned vehicle is an unmanned haul vehicle.

* * * * *